(12) United States Patent
Bakopoulos et al.

(10) Patent No.: US 11,888,561 B2
(45) Date of Patent: Jan. 30, 2024

(54) BEAMFORMING SYSTEMS, NETWORKS, AND ELEMENTS CONFIGURED FOR SIMULTANEOUS OPTICAL UP/DOWN CONVERSION AND BEAMFORMING

(71) Applicants: Mellanox Technologies, Ltd., Yokneam (IL); Aristotle University of Thessaloniki, Salonika (GR)

(72) Inventors: Paraskevas Bakopoulos, Ilion (GR); Nikolaos Argyris, Zografou (GR); Elad Mentovich, Tel Aviv (IL); Nikos Pleros, Chalkida (GR)

(73) Assignees: MELLANOX TECHNOLOGIES, LTD., Yokneam (IL); ARISTOTLE UNIVERSITY OF THESSALONIKI, Salonika (GR)

( * ) Notice: Subject to any disclaimer, the term of this patent is extended or adjusted under 35 U.S.C. 154(b) by 184 days.

(21) Appl. No.: 17/518,966

(22) Filed: Nov. 4, 2021

(65) Prior Publication Data
US 2023/0109405 A1    Apr. 6, 2023

(30) Foreign Application Priority Data
Sep. 27, 2021 (GR) .............................. 20210100636

(51) Int. Cl.
| | | |
|---|---|---|
| *H04B 10/2575* | (2013.01) | |
| *H04B 7/06* | (2006.01) | |
| *H04L 27/12* | (2006.01) | |
| *H04W 72/541* | (2023.01) | |

(52) U.S. Cl.
CPC ..... *H04B 7/0617* (2013.01); *H04B 10/25753* (2013.01); *H04B 10/25759* (2013.01); *H04L 27/12* (2013.01); *H04W 72/541* (2023.01)

(58) Field of Classification Search
None
See application file for complete search history.

(56) References Cited

U.S. PATENT DOCUMENTS

| | | | | |
|---|---|---|---|---|
| 5,710,651 | A * | 1/1998 | Logan, Jr. ........ | H04B 10/25758 398/201 |
| 10,686,523 | B1 * | 6/2020 | Gleason ............... | H01Q 21/065 |
| 2003/0165173 | A1 * | 9/2003 | Helbing .................. | H04J 14/02 372/26 |
| 2004/0062469 | A1 * | 4/2004 | Ionov ..................... | H04B 10/11 385/15 |
| 2009/0067843 | A1 * | 3/2009 | Way ..................... | H04J 14/0246 398/43 |
| 2017/0310006 | A1 * | 10/2017 | Vidal Drummond ....................... | H01Q 3/2676 |

(Continued)

*Primary Examiner* — Li Liu
(74) *Attorney, Agent, or Firm* — Moore & Van Allen PLLC; R.W. McCord Rayburn

(57) ABSTRACT

A beamforming element comprises an imprinting-shifting component configured to imprint an input signal onto a second beam to form an imprinted beam and adjust the optical phase of the imprinted beam; one or more multi-beam optical couplers configured to receive a phase-shifted imprinted beam and a first beam and form an interference beam from the combination thereof; and one or more optical-to-electrical converter components configured to receive an interference beam and generate an electrical signal based thereon that includes the beamforming time delay(s) and is frequency up/down-converted with respect to the input signal.

20 Claims, 13 Drawing Sheets

(56) References Cited

U.S. PATENT DOCUMENTS

| | | | |
|---|---|---|---|
| 2018/0102849 A1* | 4/2018 | Morton | G02B 27/00 |
| 2019/0157757 A1* | 5/2019 | Murakowski | H01Q 21/0025 |
| 2019/0267708 A1* | 8/2019 | Tennant | H04B 10/505 |
| 2023/0093054 A1* | 3/2023 | Gunzelmann | H01Q 3/2676 |
| | | | 343/702 |

* cited by examiner

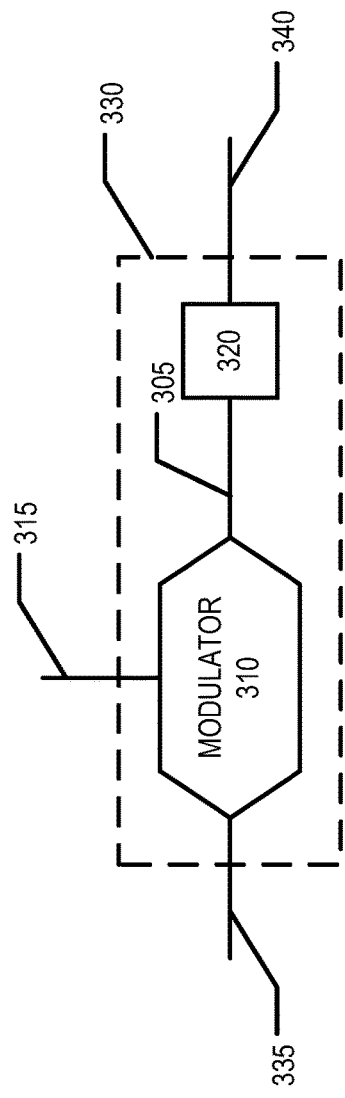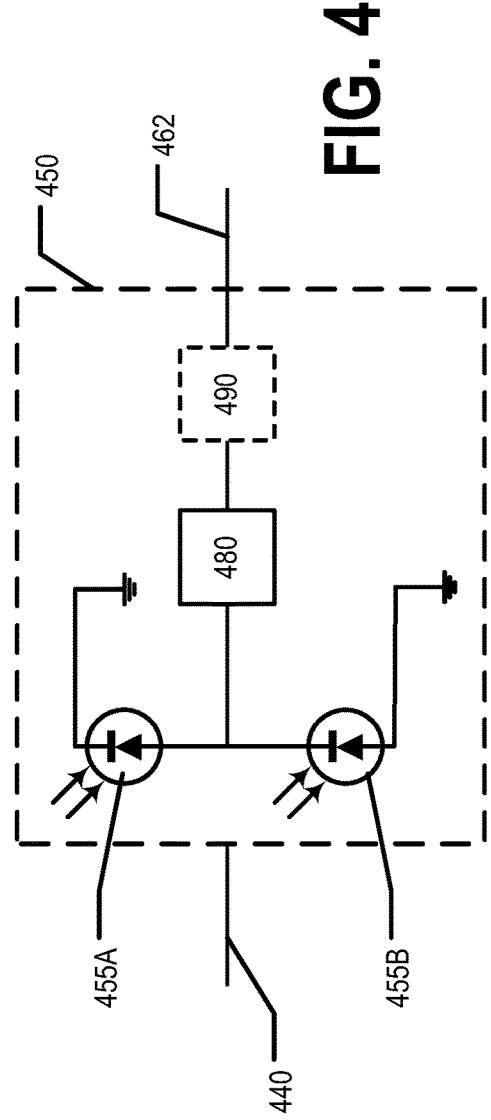

BEAMFORMING SYSTEMS, NETWORKS, AND ELEMENTS CONFIGURED FOR SIMULTANEOUS OPTICAL UP/DOWN CONVERSION AND BEAMFORMING

CROSS-REFERENCE TO RELATED APPLICATIONS

This application claims priority to Greek Patent Application No. 20210100636, filed Sep. 27, 2021, the content of which is hereby incorporated by reference herein in its entirety.

BACKGROUND

Modern wireless networks, such as 5G networks, have adopted the functionality of beamforming or spatial filtering. Beamforming or spatial filtering is a signal processing technique used in sensor and/or antenna arrays for directional signal transmission or reception. In particular, the functionality of beamforming or spatial filtering's ability to increase the directivity of the wireless beam emitted/received by an antenna and steer it to the user/group of users that have to be served by this beam, is advantageous in wireless networks. This capability improves the signal-to-noise ratio (SNR) of the respective link and facilitates frequency reuse in the wireless network through spatial multiplexing. Beamforming or spatial filtering relies on feeding the elements of a multi-element antenna with the proper RF signals, which are essentially phase-shifted copies of the same original signal, with different phase shifts imposed to the signals feeding different antenna elements. Introduction of the necessary phase shift (i.e., time delays) for each antenna element is conventionally realized in the electrical domain using digital, analog, or mixed signal approaches. However, as the operating frequency of contemporary wireless systems is increasing along with their (fractional) bandwidth, electronic implementations are facing challenges regarding phase-shift accuracy and excess loss across the signal bandwidth, physical dimensions, weight, power consumption, cost, and electromagnetic interference.

BRIEF SUMMARY

Various embodiments provide beamforming systems, beamforming elements, and/or beamforming networks that are configured to perform up/down conversion and introduce signal time delays that cause the beamforming in the optical domain. Various embodiments provide methods for use with such beamforming systems, beamforming elements, and beamforming networks. In various embodiments, a beamforming system comprises at least one multi-wavelength source configured to provide at least one first beam characterized by a first wavelength and/or a first frequency and at least one second beam characterized by a second wavelength and/or a second frequency. For example, the multi-wavelength source may generate a first beam and a second beam that are each split (with the resulting beams possibly being amplified) to provide a plurality of first beams and a plurality of second beams. The beamforming system further comprises an antenna array comprising a plurality of antennas and a plurality of beamforming elements, with each beamforming element associated with one of the plurality of antennas.

A second beam is provided to an imprinting-shifting component of a beamforming element. In various embodiments, the imprinting-shifting component comprises at least one modulator and at least one phase shifter. An electrical input signal provided to the modulator's electrical input is imprinted onto the second beam to form an imprinted beam. For example, the second beam is used as an optical carrier beam that is modulated to encode the input signal therein. The imprinted beam is provided to the phase shifter, which is configured to adjust the phase of the imprinted beam such that, when an antenna is operated based at least in part on the phase-shifted imprinted beam, the desired beamforming occurs and/or when a transmission received by the antenna array is processed, the appropriate reception beamforming is performed. For example, the phase shifter is configured to adjust the optical phase of the imprinted beam such that, when the conversion is made to the electrical domain, the resulting electrical signal includes the desired time delay.

The phase-shifted imprinted beam is provided to a multi-beam optical coupler of the beamforming element. The first beam is also provided to the multi-beam optical coupler such that the first beam and the phase-shifted imprinted beam, which uses a second beam characterized by a second wavelength and/or second frequency as an optical carrier, interact and/or interfere within one another. For example, the multi-beam optical coupler causes interference between the first beam and the phase-shifted imprinted beam to generate an interference beam that includes an encoding of the input signal imprinted into the second beam and the optical phase shift of the imprinted beam.

The interference beam is then provided to an optical-to-electrical converter component of the beamforming element such that an electrical signal is generated thereby based on the interference beam. In various embodiments, the optical-to-electrical converter component is configured to generate an induced electrical signal based on the interference beam. For example, the optical-to-electrical converter component may comprise one or more photodetectors (e.g., photodiodes, photomultiplier tubes, and/or the like). At least a portion of the interference beam is incident on the one or more photodetectors, which causes the one or more photodetectors to generate a corresponding induced electrical signal. In various embodiments, the optical-to-electrical converter component may further include one or more filters (e.g., bandpass filters, low pass filters, and/or the like) and/or one or more amplifiers (e.g., transimpedance amplifiers, and/or the like) configured to condition (e.g., filter, amplify, and/or the like) the induced electrical signal to form an output electrical signal.

In a downstream configuration, the (output) electrical signal may be provided to an antenna of an antenna array and/or an antenna element of an antenna to cause the antenna and/or antenna element to transmit and/or emit a corresponding transmission. In an upstream configuration, the (output) electrical signal may be provided to a controller or a networking device for processing, analysis, and/or the like.

According to aspect of the present disclosure, a beamforming element is provided. In an example embodiment, the beamforming element comprises an imprinting-shifting component configured to imprint a respective input signal onto a second beam to form an imprinted beam and to adjust an optical phase of the imprinted beam; one or more multi-beam optical couplers each configured to receive a respective phase-shifted imprinted beam and a first beam, and further configured to cause the phase-shifted imprinted beam and the first beam to interfere with one another to form a respective interference beam; and one or more optical-to-electrical converter components each configured to receive a respective interference beam and generate a respective frequency-shifted electrical signal based on the respective interference beam and having a time delay corresponding to the adjustment of the optical phase of the imprinted beam.

According to another aspect of the present disclosure, a beamforming element is provided. In an example embodiment, the beamforming element comprises respective beam inputs configured to receive a respective one of a first beam of a first wavelength and a second beam of a second wavelength; and an imprinting-shifting component comprising at least one modulator coupled to a respective electrical input and at least one phase shifter. The imprinting-shifting component is configured to imprint a respective input signal provided to the at least one modulator via the respective electrical input onto the second beam to form an imprinted beam and use the at least one phase shifter to adjust the optical phase of the imprinted beam. The beamforming element further comprises one or more multi-beam optical couplers each configured to receive a respective phase-shifted imprinted beam and the first beam, and cause the phase-shifted imprinted beam and the first beam to interfere with one another to form a respective interference beam; and one or more optical-to-electrical converter components each configured to receive a respective interference beam and generate a respective frequency-shifted electrical signal based on the respective interference beam and having a time delay corresponding to the adjustment of the optical phase of the imprinted beam.

In an example embodiment, the respective electrical signal is provided to a respective antenna of an antenna array to cause the respective antenna to transmit a transmission corresponding to the respective input signal.

In an example embodiment, the beamforming element is configured to operate at M channels and the imprinting-shifting component comprises M respective modulators and M respective phase shifters, with each respective modulator of the M respective modulators optically coupled to a respective corresponding one of the M respective phase shifters.

In an example embodiment, the respective input signal is one of M respective input signals that are each provided to a respective modulator of the M respective modulators via a respective electrical input, each of the M respective input signals corresponding to a respective one of the M channels.

In an example embodiment, the respective input signal is generated by an antenna of an antenna array based on a received transmission incident on the antenna.

In an example embodiment, the imprinting-shifting component comprises the at least one modulator and M phase shifters, wherein the antenna array is configured to operate at M channels.

In an example embodiment, the imprinting-shifting component further comprises a splitting optical filtering element configured to receive the imprinted beam and provide a plurality of output beams, each output beam of the plurality of output beams corresponding to a respective designated channel wavelength range.

In an example embodiment, the imprinting-shifting component further comprises a combining optical filtering element configured to receive a plurality of respective channel phase-shifted imprinted beams generated by respective phase shifters of the imprinting-shifting component, combine the plurality of respective channel phase-shifted imprinted beams into a phase-shifted imprinted beam, and provide the phase-shifted imprinted beam.

In an example embodiment, the imprinting-shifting component comprises at least two optical filtering pairs, each optical filtering pair comprising a splitting optical filtering element and a combining filtering element, each optical filtering pair of the at least two optical filtering pairs configured to operate at one or more channels, the one or more channels being non-adjacent channels.

In an example embodiment, each of the M phase shifters is in optical communication with a respective multi-beam optical coupler of the one or more multi-beam optical couplers, which is in optical communication with a respective electronic converter element of the one or more optical-to-electrical converter components.

In an example embodiment, the respective multi-beam coupler is in optical communication with only one respective phase shifter and the respective optical-to-electrical converter component is in optical communication with only one respective multi-beam coupler, and the respective electronic converter element comprises a band pass filter.

In an example embodiment, an optical-to-electrical converter component of the one or more optical-to-electrical converter components comprises one or more photodetectors and the optical-to-electrical converter component is configured such that at least a respective portion of the interference beam provided by a respective multi-beam optical coupler of the one or more multi-beam optical couplers is incident on each of the one or more photodetectors.

In an example embodiment, the respective multi-beam optical coupler is a 2×2 coupler and the one or more photodetectors comprises at least two photodetectors arranged in a differential configuration to reject a common mode signal.

In an example embodiment, the optical-to-electrical converter component comprises a filter configured to filter the respective electrical signal.

In an example embodiment, the filter is one of a microwave band pass filter or a microwave low pass filter.

According to another aspect of the present disclosure a beamforming system is provided. In an example embodiment, the beamforming system comprises an array of N antennas, where N is a positive integer; at least one multi-wavelength optical source configured to provide at least one first beam of a first frequency and at least one second beam of a second frequency; and N beamforming elements, each beamforming element of the N beamforming elements associated with a respective one of the N antennas. Each beamforming element comprises an imprinting-shifting component configured to imprint a respective input signal onto a second beam to form an imprinted beam and to adjust an optical phase of the imprinted beam; one or more multi-beam optical couplers each configured to receive a respective phase-shifted imprinted beam and a first beam, and further configured to cause the phase-shifted imprinted beam and the first beam to interfere with one another to form a respective interference beam; and one or more optical-to-electrical converter components each configured to receive a respective interference beam and generate a respective frequency-shifted electrical signal based on the respective interference beam and having a time delay corresponding to the adjustment of the optical phase of the imprinted beam.

According to another aspect, a beamforming system is provided. In an example embodiment, the beamforming system comprises an array of N antennas, where N is a positive integer; at least one multi-wavelength optical source configured to provide at least one first beam of a first frequency and at least one second beam of a second frequency; and N beamforming elements, each beamforming element of the N beamforming elements associated with a respective one of the N antennas. Each beamforming element comprises respective beam inputs configured to receive a first beam of the at least one first beam and a second beam of the at least one second beam; and an imprinting-shifting component comprising at least one modulator coupled to a respective electrical input and at least one phase shifter. The imprinting-shifting component is configured to imprint a respective input signal provided to the at least one modulator via the respective electrical input onto the second beam to form an imprinted beam and use the at least one phase shifter to adjust the optical phase of the imprinted beam. Each beamforming element further comprises one or more multi-beam optical couplers each configured to receive a respective phase-shifted imprinted beam and the first beam, and further configured to cause the phase-shifted imprinted beam and the first beam to interfere with one another to form a respective interference beam; and one or more optical-to-electrical converter components each configured to receive a respective interference beam and generate a respective frequency-shifted electrical signal based on the respective interference beam and having a time delay corresponding to the adjustment of the optical phase of the imprinted beam.

In an example embodiment, the beamforming system further comprises a controller configured to at least one of (a) control the respective input signal provided via the respective electrical input, (b) control a control signal configured to control operation of the at least one phase shifter, or (c) receive the respective electrical signal.

In an example embodiment, the multi-wavelength optical source comprises a laser configured to generate a laser beam, an optical source modulator configured to modulate the laser beam, and an optical filtering component configured to filter the modulated laser beam to provide the at least one first beam and the at least one second beam.

In an example embodiment, the multi-wavelength optical source comprises a frequency comb generator and an optical filtering component configured to filter an output of the frequency comb generator to provide the at least one first beam and the at least one second beam.

In an example embodiment, a difference between the first frequency and the second frequency is a particular frequency difference, the respective electrical signal is characterized by a respective signal frequency and corresponds to a channel characterized by a transmission frequency, a difference between the respective signal frequency and the transmission frequency being the particular frequency difference.

In an example embodiment, the respective electrical signal is provided to a respective antenna of an antenna array to cause the respective antenna to transmit a transmission corresponding to the respective input signal.

In an example embodiment, the beamforming element is configured to operate at M channels and the imprinting-shifting component comprises M respective modulators and M respective phase shifters, with each respective modulator of the M respective modulators optically coupled to a respective corresponding one of the M respective phase shifters.

In an example embodiment, the respective input signal is one of M respective input signals that are each respectively provided to a respective modulator of the M respective modulators via a respective electrical input, each of the M respective input signals corresponding to a respective one of the M channels.

In an example embodiment, the respective input signal is generated by an antenna of an antenna array based on a received transmission incident on the antenna.

In an example embodiment, the imprinting-shifting component comprises the at least one modulator and M phase shifters, wherein the antenna array is configured to operate at M channels.

In an example embodiment, the imprinting-shifting component further comprises a splitting optical filtering element configured to receive the imprinted beam and provide a plurality of output beams, each output beam of the plurality of output beams corresponding to a respective designated channel wavelength range.

In an example embodiment, the imprinting-shifting component further comprises a combining optical filtering element configured to receive a plurality of respective channel phase-shifted imprinted beams generated by respective phase shifters of the imprinting-shifting component, combine the plurality of respective channel phase-shifted imprinted beams into a phase-shifted imprinted beam, and provide the phase-shifted imprinted beam.

In an example embodiment, the imprinting-shifting component comprises at least two optical filtering pairs, each optical filtering pair comprising a splitting optical filtering element and a combining filtering element, each optical filtering pair of the at least two optical filtering pairs configured to operate at one or more channels, the one or more channels being non-adjacent channels.

In an example embodiment, each of the M phase shifters is in optical communication with a respective multi-beam optical coupler of the one or more multi-beam optical couplers, which is in optical communication with a respective electronic converter element of the one or more optical-to-electrical converter components.

In an example embodiment, the respective multi-beam coupler is in optical communication with only one respective phase shifter and the respective optical-to-electrical converter component is in optical communication with only one respective multi-beam coupler, and the respective electronic converter element comprises a band pass filter.

In an example embodiment, an optical-to-electrical converter component of the one or more optical-to-electrical converter components comprises one or more photodetectors and the optical-to-electrical converter component is configured such that at least a respective portion of the interference beam provided by a respective multi-beam optical coupler of the one or more multi-beam optical couplers is incident on each of the one or more photodetectors.

In an example embodiment, the respective multi-beam optical coupler is a 2×2 coupler and the one or more photodetectors comprises at least two photodetectors arranged in a differential configuration to reject a common mode signal.

In an example embodiment, the optical-to-electrical converter component comprises a filter configured to filter the respective electrical signal.

In an example embodiment, the filter is one of a microwave band pass filter or a microwave low pass filter.

BRIEF DESCRIPTION OF THE DRAWING(S)

Having thus described the invention in general terms, reference will now be made to the accompanying drawings, which are not necessarily drawn to scale, and wherein:

FIG. 3 is a block diagram illustrating a beamforming element, according to an example embodiment;

FIG. 4 is a block diagram illustrating an optical-to-electrical converter component, according to an example embodiment;

DETAILED DESCRIPTION OF THE INVENTION

Figure 1A:
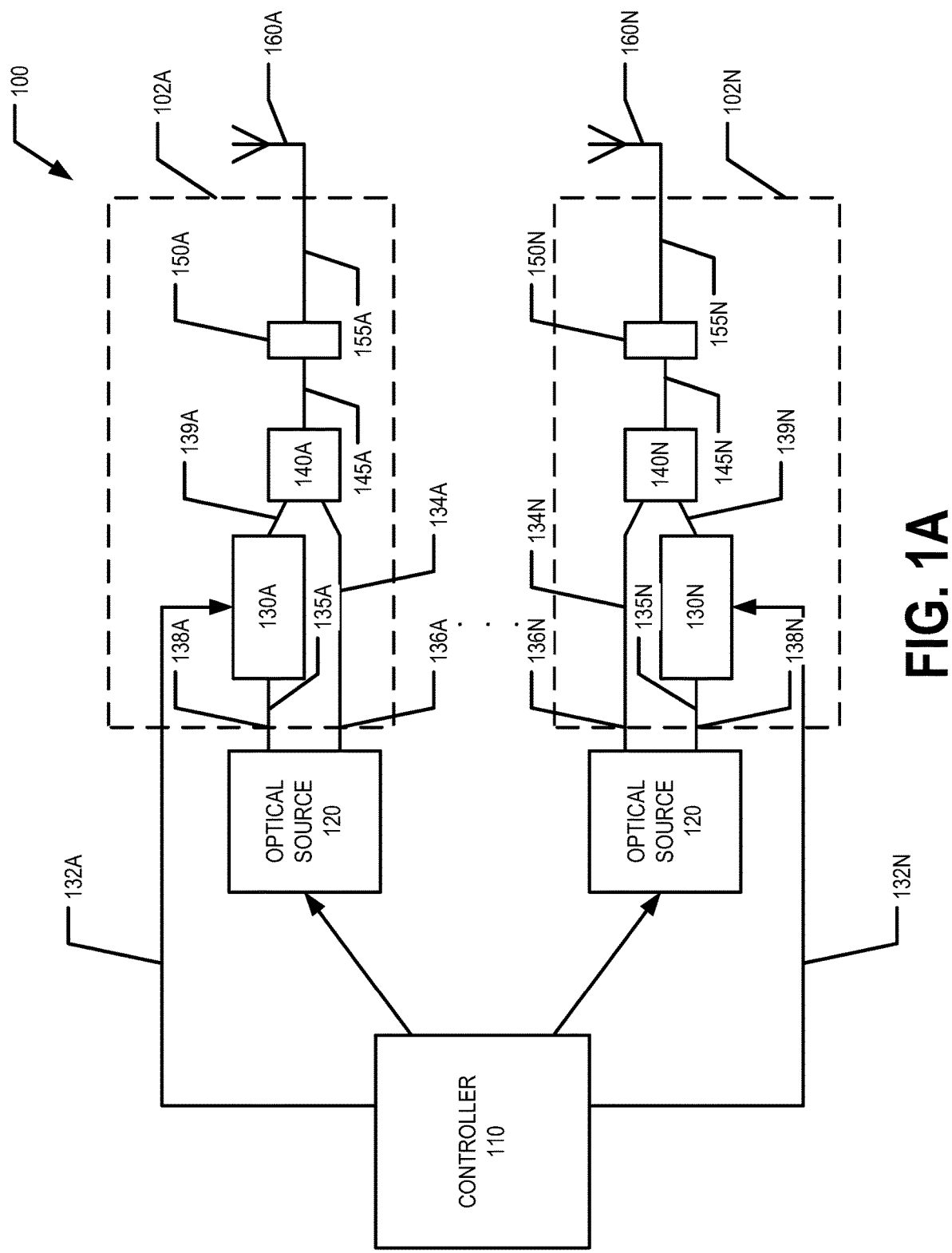
FIG. 1A is a block diagram of an example beamforming system in a downstream configuration, according to an example embodiment.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "top," "about," "around," etc. are used for explanatory purposes in the examples provided below to describe the relative position of certain components or portions of components. As used herein, the terms "substantially" and "approximately" refer to tolerances within manufacturing and/or engineering standards.

Beamforming or spatial filtering is a signal processing technique used in antenna arrays and/or multi-element antennas for directional signal transmission or reception. This is achieved by combining elements in an antenna array in such a way that signals at particular angles experience constructive interference while others experience destructive interference. Beamforming can be used in both upstream and downstream configurations in order to achieve spatial selectivity. Introduction of the necessary phase shift (i.e. time delays) for each antenna of an antenna array is typically realized in the electrical domain using digital, analog, or mixed signal approaches. However, as the operating frequency and (fractional) bandwidth of contemporary wireless systems is increasing, electronic implementations are facing challenges regarding phase-shift accuracy and excess loss across the signal bandwidth, physical dimensions, weight, power consumption, cost, and electromagnetic interference.

Various embodiments provide technical solutions to these technical problems. For example, in various embodiments, the time delay required for beamforming is introduced by modifying and/or adjusting the optical phase of an optical signal. For example, the time delay is introduced as an optical phase shift in the optical domain. Moreover, radio frequency (RF) up- and/or down-conversion is performed simultaneously as the introduction of the required time delay. Thus, various embodiments provide the advantage of reducing the energy consumption, cost, and space associated with RF up and/or down-converter circuits. Moreover, various embodiments prevent the technical problems caused by the degradation of performance and fractional bandwidth of RF up- and/or down-converter circuits as operating frequencies increase. Various embodiments provide the technical advantage of reducing the number of high speed electrical and/or electro-optical components required in addition to those present in the baseband unit (BBU). Various embodiments further prevent the need for precisely-tuned sharp/steep optical filters for single-sideband (SSB) generations and/or precisely-tuned optical ring resonators for introducing true time delays.

Overview of Example Beamforming Systems

Figure 1B:
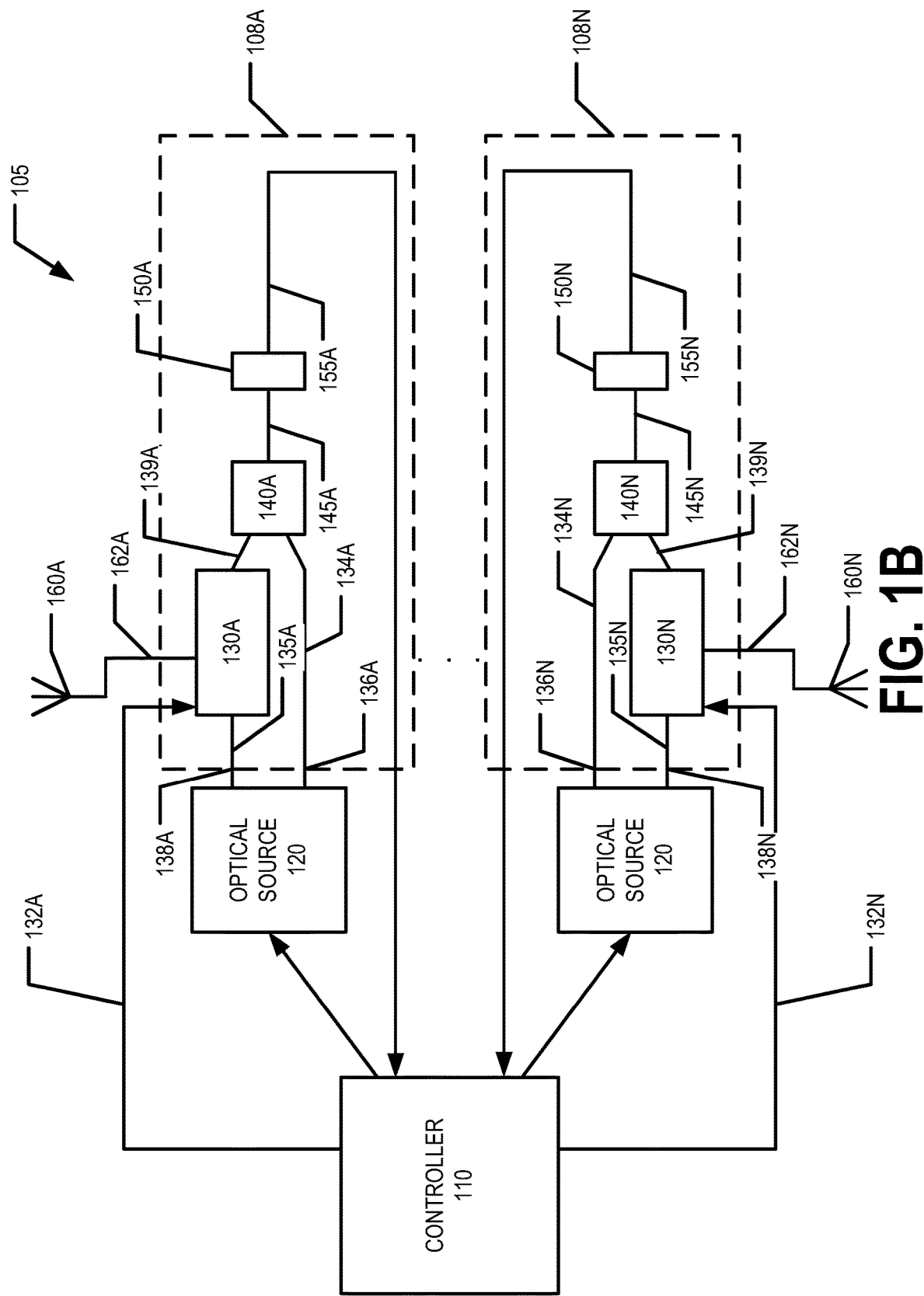
FIG. 1B is a block diagram of an example beamforming system in an upstream configuration, according to an example embodiment.

FIG. 1A illustrates a downstream configuration of a beamforming system 100 and FIG. 1B illustrates an upstream configuration of a beamforming system 105. For example, as shown in FIG. 1A, in a downstream configuration of the beamforming system 100, the input signal(s) provided to a imprinting-shifting component 130 (e.g., 130A, 130B) is generated and/or caused to be provided by a controller 110 and the electrical signal generated by the optical-to-electrical converter component 150 (e.g., 150A, 150N) are provided to a corresponding antenna 160 (e.g., 160A, 160N) such that the corresponding antenna 160 transmits and/or emits a transmission based on the electrical signal. In an upstream configuration of the beamforming system 105, as shown in FIG. 1B, an input signal provided to an imprinting-shifting component 130 is generated by a transmission being incident on corresponding antenna 160. In various embodiments, in an upstream configuration, the electrical signal is provided to the controller 110 for processing, analysis, and/or the like.

As shown in FIG. 1A, an example embodiment of a downstream configuration of the beamforming system 100 comprises a controller 110, a multi-wavelength optical source 120, an antenna array comprising a plurality of antennas 160 (and/or antenna elements), and a plurality of beamforming elements 102 (e.g., 102A, 102N). In an example embodiment, the plurality of antennas comprises N antennas (or antenna elements) 160, where N is a positive integer. In various embodiments, the beamforming system 100 comprises N beamforming elements 102, each associated with a respective antenna 160 of the N antennas.

In the illustrated embodiment, a beamforming element 102 comprises a first beam waveguide and/or optical fiber 134 (e.g., 134A, 134N) and a second beam waveguide and/or optical fiber 135 (e.g., 135A, 135N). In various embodiments, the first beam waveguide and/or optical fiber 134 is configured to receive a first beam generated and/or provided by the multi-wavelength optical source 120 via first beam input 136 (e.g., 136A, 136N) and provide the first beam to the respective multi-beam optical coupler 140 (e.g., 140A, 140N). In various embodiments, the second beam waveguide and/or optical fiber 135 is configured to receive a second beam generated and/or provided by the multi-wavelength optical source 120 via first beam input 136 (e.g., 136A, 136N) and provide the first beam to the respective multi-beam optical coupler 140 (e.g., 140A, 140N). In various embodiments, the first beam is characterized by a first frequency and the second beam is characterized by a second frequency.

The illustrated beamforming element 102 further comprises an imprinting-shifting component 130 configured to imprint an (electrical) input signal (e.g., generated and/or controlled by the controller 110) onto the second beam to generate an imprinted beam. In various embodiments, the input signal is imprinted onto the second beam using a modulator such that the second beam is an optical carrier that is imprinted with frequency components of the input signal. In various embodiments, the imprinting-shifting component 130 is further configured to introduce a time delay, possibly in the form of an optical phase shift, of the imprinted beam so as to form a phase-shifted imprinted beam. By introducing the time delay via the optical phase shift, rather than as a true time delay (e.g., using a ring resonator), the need for high precision optical components is reduced, in various embodiments. The imprinting-shifting component 130 is configured to provide the phase-shifted imprinted beam via an output thereof. For example, the phase-shifted imprinted beam may be provided as output of the imprinting-shifting component 130 via an optical fiber, waveguide, and/or free space propagation. In the illustrated embodiment, the imprinting-shifting component 130 couples the phase-shifted imprinted beam into a shifted beam waveguide and/or optical filter 139 (e.g., 139A, 139N).

In various embodiments, the beamforming element 102 comprises one or more inputs 132 (e.g., 132A, 132N). In various embodiments, the controller 110 generates and/or causes generation of (electrical) input signals that are provided to the beamforming element 102 via the one or more inputs. In an example embodiment, one of the inputs 132 is configured to receive an electrical input signal generated by and/or caused to be generated by the controller 110 and provided to an electrical input of the modulator configured to imprint the input signal on the second beam. In an example embodiment, one of the inputs 132 is configured to receive a phase control signal generated by and/or caused to be generated by the controller 110 and provided to an input port of the phase shifter to cause the phase shifter to induce, impart, and/or cause an optical phase shift of a desired amount.

The illustrated beamforming element 102 further comprises a multi-beam optical coupler 140 (e.g., 140A, 140N). The multi-beam optical coupler is configured to receive the phase-shifted imprinted beam (e.g., via the shifted waveguide and/or optical fiber 139) and to receive a first beam (e.g., via the first beam waveguide and/or optical fiber 134). In an example embodiment, the multi-beam optical coupler 140 is configured to cause the first beam and the phase-shifted imprinted beam to interfere, interact, and/or sum with one another to form an interference beam. In particular, the interference, interaction, and/or summing of the first beam and the phase-shifted imprinted beam (having the second beam as the optical carrier) will exhibit a beat pattern based on the particular frequency difference between the first frequency of the first beam and the second frequency of the second beam (which is the optical carrier of the phase-shifted imprinted beam). The interference beam will further include the frequency components of the input signal imprinted onto the second beam to form the imprinted beam having the imposed optical phase shift. In various embodiments, the multi-beam optical coupler couples the interference beam into an interference beam waveguide and/or optical fiber 145 (e.g., 145A, 145N).

In various embodiments, the multi-beam coupler 140 provides the interference beam via an optical fiber, waveguide, or free space propagation. In various embodiments, the multi-beam optical coupler 140 is configured to provide multiple outputs (e.g., multiple interference beams). For example, the multi-beam optical coupler 140 may be a 2×2 coupler which includes two inputs and two outputs. For example, the multi-beam optical coupler 140 may comprise more than one output and may include a beam splitter configured to split the interference beam into two interference beams with one interference beam provided via each output. In such embodiments, the beamforming element may include two or more interference beam waveguides and/or optical fiber 145.

The illustrated beamforming element 102 further comprises an optical-to-electrical converter component 150 (e.g., 150A, 150N). In various embodiments, the optical-to-electrical converter component 150 comprises one or more photodetectors. In various embodiments, the optical-to-electrical converter component 150 is configured to receive the interference beam and convert the interference beam into an (induced) electrical signal. In various embodiments, the electrical signal generated by the optical-to-electrical converter component 150 is up-converted or down-converted with respect to the input signal received by the imprinting-shifting component 130. For example, a respective frequency characterizing the frequency components of the electrical signal generated by the optical-to-electrical converter component 150 is increased in frequency or decreased in frequency with respect to the respective input signal. In various embodiments, the optical-to-electrical converter component 150 comprises optical domain and/or electrical domain filters (e.g., bandpass filters, low pass filters, high pass filters, and/or the like). For example, the photodetectors may generate an induced electrical signal which may then be conditioned (e.g., filtered, amplified, and/or the like) to generate an output electrical signal. The optical-to-electrical converter component 150 is configured to provide the (output) electrical signal via the electrical output 155 (e.g., 155A, 155N) to a corresponding antenna 160 of the antenna array. In an example embodiment, the electrical output 155 is a wire or other electrically conductive component.

As noted above, the downstream configuration of the beamforming system 100 comprises a controller 110. In various embodiments, the controller 110 is configured to control the operation of the multi-wavelength optical source 120, generate or cause generation of the input signals provided to the beamforming elements 102 (e.g., via inputs 132), and/or the like. In various embodiments, the controller 110 is a baseband unit (BBU), a combination of a remote radio head (RRH) and a BBU, and/or the like.

In various embodiments, the multi-wavelength optical source 120 is configured to generate at least one first beam characterized by a first wavelength and/or a first frequency and to generate at least one second beam characterized by a second wavelength and/or a second frequency. In various embodiments, the first and second beam are phase-locked with respect to one another. In various embodiments, the particular frequency difference between the first frequency and the second frequency is stabilized and/or the first beam and the second beam are individually frequency stabilized. In various embodiments, the beamforming system 100 comprises a single multi-wavelength optical source 120 configured to generate a first beam and a second beam and split (and possibly amplify) the first beam and the second beam into a plurality of first beams and a plurality of second beams, respectively. In various embodiments, the beamforming system 100 comprises two or more multi-wavelength optical sources 120 each configured to generate and/or provide at least one first beam and at least one second beam.

In various embodiments, the antennas 160 are part of an antenna array and/or are antenna elements of a multi-element antenna. For example, the antenna array may be a 5G antenna array and/or an antenna array configured to emit and/or receive signals (e.g., wirelessly transmitted telecommunications signals). In various embodiments, the antennas 160 are configured to transmit and/or receive radio frequency transmissions and/or transmitted signals.

The upstream configuration of the beamforming system 105 illustrated in FIG. 1B is similar to the downstream configuration of the beamforming system 100 illustrated in FIG. 1A. For example, the beamforming system 105 comprises a controller 110, a multi-wavelength optical source 120, and an antenna array comprising a plurality of antennas 160. In an example embodiment, the plurality of antennas comprises N antennas (or antenna elements) 160, where N is a positive integer. The upstream configuration of the beamforming system 105 further comprises a plurality of beamforming elements 108 (108A, 108N). In an example embodiment, the upstream configuration of the beamforming system 105 comprises N beamforming elements 108 with each beamforming element associated with a respective antenna 160 of the N antennas.

Rather than the beamforming elements 108 receiving an input signal to be imprinted on the second beam that was generated by and/or caused to be generated by the controller 110, the beamforming elements 108 receive input signals generated by transmissions being incident on a respective antenna 160. For example, transmissions incident on the first antenna 160A cause the first antenna 160A to generate an electrical input signal that is provided to a first imprinting-shifting component 108A via a first antenna-induced input 162A. The controller 110 may generate and/or cause generation of input signals provided to the beamforming elements 108 that control the optical phase shift imparted to imprinted beams, and/or the like via inputs 132.

In the illustrated embodiment, a beamforming element 108 comprises a first beam waveguide and/or optical fiber 134 (e.g., 134A, 134N) and a second beam waveguide and/or optical fiber 135 (e.g., 135A, 135N). In various embodiments, the first beam waveguide and/or optical fiber 134 is configured to receive a first beam generated and/or provided by the multi-wavelength optical source 120 via first beam input 136 (e.g., 136A, 136N) and provide the first beam to the respective multi-beam optical coupler 140 (e.g., 140A, 140N). In various embodiments, the second beam waveguide and/or optical fiber 135 is configured to receive a second beam generated and/or provided by the multi-wavelength optical source 120 via a second beam input 136 (e.g., 136A, 136N) and provide the second beam to the imprinting-shifting component 130.

The illustrated beamforming element 108 further comprises an imprinting-shifting component 130 configured to imprint an electrical input signal (e.g., generated by transmissions being incident on a corresponding antenna 160) onto the second beam to generate an imprinted beam. In various embodiments, the input signal is imprinted onto the second beam using a modulator such that the second beam is an optical carrier that is imprinted with frequency components of the input signal. In various embodiments, the imprinting-shifting component 130 is further configured to introduce a time delay, possibly in the form of an optical phase shift, of the imprinted beam so as to form a phase-shifted imprinted beam. By introducing the time delay via the optical phase shift, rather than as a true time delay (e.g., in the time domain using a ring resonator), the need for high precision optical components is reduced, in various embodiments. The imprinting-shifting component 130 is configured to provide the phase-shifted imprinted beam via an output thereof. For example, the phase-shifted imprinted beam may be provided as output of the imprinting-shifting component 130 via an optical fiber, waveguide, and/or free space propagation. In the illustrated embodiment, the imprinting-shifting component 130 couples the phase-shifted imprinted beam into shifted beam waveguide and/or optical fiber 139 (e.g., 139A, 139N).

In various embodiments, the beamforming element 108 comprises at least one input 132 (e.g., 132A, 132N) and an antenna-induced input 162. In various embodiments, the controller 110 generates and/or causes generation of input signals that are provided to the beamforming element 108 via the one or more inputs. In an example embodiment, one of the inputs 132 is configured to receive a phase control signal generated by and/or caused to be generated by the controller 110 and provided to an input port of the phase shifter to cause the phase shifter to induce, impart, and/or cause an optical phase shift of a desired amount. In an example embodiment, the antenna-induced input 162 is configured to receive an input signal generated by a transmission being incident on a corresponding antenna 160.

The illustrated beamforming element 108 further comprises a multi-beam optical coupler 140 (e.g., 140A, 140N). The multi-beam optical coupler is configured to receive the phase-shifted imprinted beam (e.g., via the shifted beam waveguide and/or optical fiber 139) and to receive a first beam (e.g., via the first beam waveguide and/or optical fiber 134). In an example embodiment, the multi-beam optical coupler 140 is configured to cause the first beam and the phase-shifted imprinted beam to interfere, interact, and/or sum with one another to form an interference beam. In particular, the interference, interaction, and/or summing of the first beam and the phase-shifted imprinted beam (having the second beam as the optical carrier) will exhibit a beat pattern based on the particular frequency difference between the first frequency of the first beam and the second frequency of the second beam (which is the optical carrier of the phase-shifted imprinted beam). The interference beam will further include the frequency components of the input signal imprinted onto the second beam to form the imprinted beam having the imposed optical phase shift. In various embodiments, the multi-beam optical coupler couples the interference beam into an interference beam waveguide and/or optical fiber 145 (e.g., 145A, 145N).

In various embodiments, the multi-beam coupler provides the interference beam via an optical fiber, waveguide, or free space propagation. In various embodiments, the multi-beam optical coupler 140 is configured to provide multiple outputs (e.g., multiple interference beams). For example, the multi-beam optical coupler 140 may be a 2×2 coupler which includes two inputs and two outputs. For example, the multi-beam optical coupler 140 may comprise more than one output and may include a beam splitter configured to split the interference beam into two interference beams with one interference beam provided via each output. In such embodiments, the beamforming element may include two or more interference beam waveguides 145 (or optical fibers, and/or the like). In various embodiments, the multi-beam optical coupler 140 is a single mode coupler, optical couplers that are part of a photonic integrated circuit chip (e.g., possibly with the imprinting-shifting component 130 formed or fabricated as part of the same photonic integrated circuit chip) such as a multi-mode interference coupler or directional coupler, a fused optical coupler, and/or other generally wavelength insensitive optical coupler. In various embodiments, the multi-beam optical coupler 140 could be an array waveguide grating (AWG) or Echelle gratings, or other wavelength selective coupling element to multiplex one or more beams and/or optical signals at given wavelengths with a first beam. In an example embodiment, such a wavelength selective coupling element may be formed as part of a photonic integrated circuit (e.g., possibly with the imprinting-shifting component 130 formed or fabricated as part of the same photonic integrated circuit chip).

The illustrated beamforming element 108 further comprises an optical-to-electrical converter component 150 (e.g., 150A, 150N). In various embodiments, the optical-to-electrical converter component 150 comprises one or more photodetectors. In various embodiments, the optical-to-electrical converter component 150 is configured to receive the interference beam and convert the interference beam into an (induced) electrical signal. In various embodiments, frequency components of the electrical signal generated by the optical-to-electrical converter component 150 are up-converted or down-converted with respect to the corresponding frequency components of the electrical input signal received by the imprinting-shifting component 130. For example, the frequency components of the electrical signal generated by the optical-to-electrical converter component 150 is increased in frequency or decreased in frequency with respect to the input signal. In various embodiments, the electrical converter component 150 comprises optical domain and/or electrical domain filters (e.g., bandpass filters, low pass filters, high pass filters, and/or the like). For example, the electrical converter component 150 may be configured to condition (e.g., filter, amplify, and/or the like) the induced electrical signal to generate and/or form an output electrical signal. The optical-to-electrical converter component 150 is configured to provide the (output) electrical signal via the electrical output 155 (e.g., 155A, 155N) to the controller 110 for processing, analysis, and/or the like. In an example embodiment, in which the beamforming system 105 is acting as a relay in a wireless network, the electrical signal may be provided to an antenna 160 and/or as an input signal to a beamforming element 102 of a downstream configuration beamforming system 100 so as to cause an antenna to transmit and/or emit a transmission based on the electrical signal so as to relay the received transmission. In an example embodiment, the electrical output 155 is a wire or other electrically conductive component.

As noted above, the upstream configuration of the beamforming system 105 comprises a controller 110. In various embodiments, the controller 110 is configured to control the operation of the multi-wavelength optical source 120, generate or cause generation of the input signals (e.g., time delay and/or phase shift control signals) provided to the beamforming elements 108 (e.g., via inputs 132), and/or the like. In various embodiments, the controller 110 is a BBU, a combination of an RRH and a BBU, and/or the like.

In various embodiments, the multi-wavelength optical source 120 is configured to generate at least one first beam characterized by a first wavelength and/or a first frequency and to generate at least one second beam characterized by a second wavelength and/or a second frequency. In various embodiments, the first and second beam are phase-locked with respect to one another. In various embodiments, the particular frequency difference between the first frequency and the second frequency is stabilized and/or the first beam and the second beam are individually frequency stabilized. In various embodiments, the beamforming system 105 comprises a single multi-wavelength optical source 120 configured to generate a first beam and a second beam and split (and possibly amplify) the first beam and the second beam into a plurality of first beams and a plurality of second beams, respectively. In various embodiments, the beamforming system 105 comprises two or more multi-wavelength optical sources 120 each configured to generate and/or provide at least one first beam and at least one second beam.

In various embodiments, the antennas 160 are part of an antenna array and/or antenna elements of a multi-element antenna. For example, the antenna array may be a 5G antenna array and/or an antenna array configured to emit and/or receive signals (e.g., wirelessly transmitted telecommunications signals). In various embodiments, the antennas 160 are configured to transmit and/or receive radio frequency transmissions and/or transmitted signals.

As shown in FIGS. 1A and 1B, each beamforming element 102, 108 comprises a first beam waveguide and/or optical fiber 134, a second beam waveguide and/or optical fiber 135, an imprinting-shifting component 130, a multi-beam optical coupler 140, and an optical-to-electrical converter component 150.

Some Example Embodiments of a Multi-Wavelength Optical Source

Figure 2A:
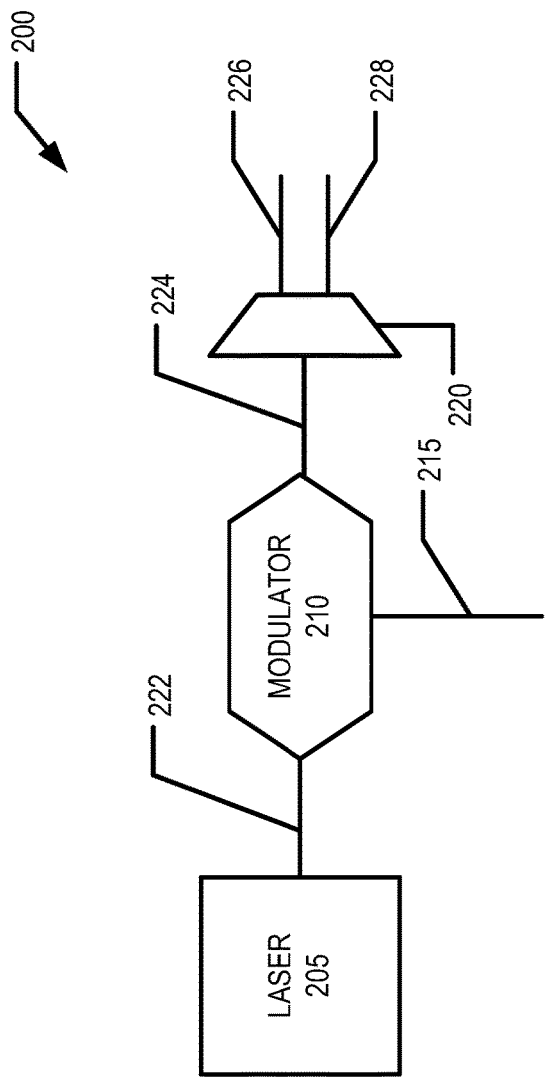
FIG. 2A is a block diagram of a multi-wavelength optical source, according to an example embodiment.
Figure 2B:
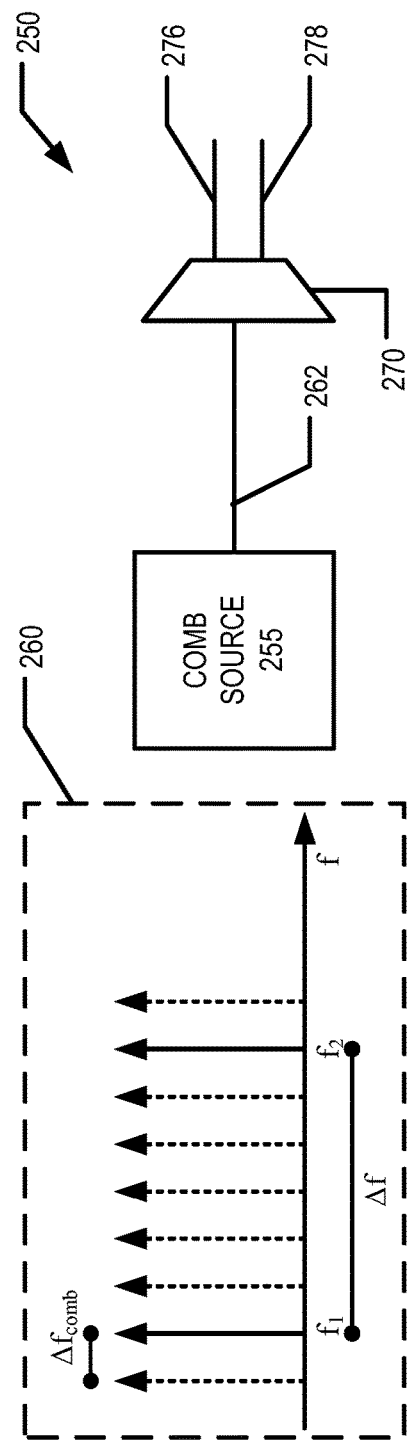
FIG. 2B is a block diagram of a multi-wavelength optical source, according to another example embodiment.

FIG. 2A illustrates an example embodiment of a multi-wavelength optical source 200 that may be used as the multi-wavelength optical source 120 in various embodiments. FIG. 2B illustrates an example embodiment of a multi-wavelength optical source 250 that may be used as the multi-wavelength optical source 120, in various embodiments. FIGS. 2A and 2B each illustrate a respective example embodiment of a multi-wavelength optical source 120; however, various other types of multi-wavelength optical sources 120 may be used in various embodiments of beamforming systems 100, 105.

In various embodiments, the multi-wavelength optical source 120, 200, 250 is configured to generate and/or provide a first beam characterized by a first wavelength and/or first frequency and to generate and/or provide a second beam characterized by a second wavelength and/or second frequency. In various embodiments, the first and second frequencies are in the optical or visible spectrum (e.g., frequencies within the range of approximately 400 THz to 800 THz and/or a range corresponding to wavelengths within the range of approximately 350 nm to 750 nm). The first frequency and the second frequency are separated by a particular frequency difference $\Delta f$ ($|f_1 - f_2| = \Delta f$). In various embodiments, the particular frequency difference is in the radio frequency range (e.g., 1 kHz to 500 GHz).

The beamforming elements 102, 108 are configured to impart optical phase delays so as to enable the desired beamforming and are configured to simultaneously up-convert or down-convert the frequency at which the information encoded by the respective input signals is provided (e.g., the frequency at which the information is encoded by the output electrical signal is up-converted or down-converted with respect to the frequency at which the information is encoded by the respective input signal, in various embodiments). In particular, the up-conversion or down-conversion is a lateral translation in the frequency domain that is equal to the particular frequency difference $\Delta f$. Thus, in various embodiments, the first and second frequency and/or the particular frequency difference are selected based on the desired up- and/or down-conversion.

The multi-wavelength optical source 200 illustrated in FIG. 2A comprises a laser 200, a modulator 210 (e.g., a Mach Zehnder interferometer (MZI) modulator, a linear modulator (e.g., organic, silicon, GaAs, InP, and/or other linear modulator), an electro-absorption modulator (coupled to a carrier suppression block that removes the initial carrier of the topology), and/or the like), and an optical filtering element 220. In various embodiments, the multi-wavelength optical source 250 further comprises one or more beam splitters and/or amplification components (e.g., transimpedance amplifiers, resonance cavities, and/or the like).

In various embodiments, the laser 200 generates a laser beam which is coupled into a laser waveguide and/or optical fiber 222. The laser waveguide and/or optical fiber 222 provides the laser beam generated by the laser to the modulator 210.

The modulator 210 comprises an optical source input 215 configured to receive a controlling electrical signal. For example, the controller 110 may control the operation of the multi-wavelength optical source 200, at least in part, via application of a controlling signal to the optical source input 215. The modulator 210 is configured to modulate the laser beam and couple the modulated laser beam into modulated waveguide and/or optical fiber 224.

The modulated waveguide and/or optical fiber 224 provides the modulated laser beam to the optical filtering element 220. In various embodiments, the optical filtering element 220 is an AWG. In various embodiments, the optical filtering element 220 is configured to select, from the modulated laser beam, a first beam portion of the modulated laser beam that is characterized by a first frequency and/or first wavelength and a second beam portion of the modulated laser beam that is characterized by a second frequency and/or a second wavelength.

In various embodiments, the optical filtering element 220 comprises two outputs, each configured to provide one of the selected beam portions. For example, the optical filtering element 220 provides the first beam portion to a first beam waveguide and/or optical fiber 228. For example, the optical filtering element 220 provides the second beam portion to a second beam waveguide and/or optical fiber 226. The first beam waveguide and/or optical fiber 228 provides the first beam portion as the first beam and the second beam waveguide and/or optical fiber 226 provides the second beam portion as the second beam.

In an example embodiment, the first beam portion and/or second beam portion may be split (e.g., using one or more beam splitters) into multiple beams each characterized by the first and/or second wavelength and/or the first and/or second frequency, respectively. In various embodiments, the beam splitter(s) used to split the first beam portion and/or the second beam portion into multiple beams characterized by the first and/or second wavelength/frequency, respectively, may be a single mode beam splitter, an optical splitter that is part of a photonic integrated circuit chip such as a multi-mode interference splitter or directional splitter, a fused optical splitter, and/or other generally wavelength insensitive optical splitter. In various embodiments, the beam splitter could be an array waveguide grating (AWG) or Echelle gratings, or other wavelength selective splitting element to demultiplex the first beam portion and/or the second beam portion and split the respective beams into a plurality of beams. In an example embodiment, such a wavelength selective splitting element may be formed as part of a photonic integrated circuit.

In various embodiments, the first beam portion and/or second beam portion (and/or parts thereof in embodiments where the first beam portion and/or second beam portion are split into multiple beams) may be amplified (e.g., using one or more amplification components) to a desired amplitude or power level prior to the providing of the beam portions as respective first beam(s) and second beam(s). For example, a plurality of first beam waveguides and/or optical fibers and a plurality of second beam waveguides and/or optical fibers may be configured to couple the multi-wavelength optical source 200 with respective ones of the beamforming elements 102, 108.

The multi-wavelength optical source 250 illustrated in FIG. 2B comprises a frequency comb source 255 and an optical filtering element 270. In various embodiments, the multi-wavelength optical source 250 further comprises one or more beam splitters and/or amplification components (e.g., transimpedance amplifiers, resonance cavities, and/or the like).

In various embodiments, the frequency comb source 255 is configured to generate a frequency comb 260. In various embodiments, a frequency comb source 255 is a laser source whose spectrum consists of a series of discrete, equally spaced frequency lines. In various embodiments, the frequency comb source 255 may take a variety of forms. For example, the frequency comb may be generated via various mechanisms, including periodic modulation (in amplitude and/or phase) of a continuous-wave laser, four-wave mixing in nonlinear media, and stabilization of the pulse train generated by a mode-locked laser. For example, the frequency comb source 255 is configured to generate a frequency comb 260 comprising a plurality of frequency lines each spaced, in the frequency domain, from its neighboring and/or adjacent frequency lines by a comb frequency difference $\Delta f_{comb}$. The first frequency and the second frequency are selected frequency lines of the frequency comb 260. For example, the particular frequency difference $\Delta f$ is an integer multiple of the comb frequency difference $\Delta f_{comb}$ (e.g., $\Delta f = n \times \Delta f_{comb}$, where n is an integer). The frequency comb source 255 generates a frequency comb beam (which is characterized in frequency space as the frequency comb 260) and couples the frequency comb beam into a comb waveguide and/or optical fiber 262.

The comb waveguide and/or optical fiber 262 provides the frequency comb beam generated by the frequency comb source 255 to the optical filtering element 270. In various embodiments, the optical filtering element 270 is an AWG. In various embodiments, the optical filtering element 270 is configured to select, from the frequency comb beam, a first beam portion of the frequency comb beam that is characterized by a first frequency and/or first wavelength and a second beam portion of the frequency comb beam that is characterized by a second frequency and/or a second wavelength.

In various embodiments, the optical filtering element 270 comprises two outputs, each configured to provide one of the selected beam portions. For example, the optical filtering element 270 provides the first beam portion to a first beam waveguide and/or optical fiber 278. For example, the optical filtering element 270 provides the second beam portion to a second beam waveguide and/or optical fiber 276. The first beam waveguide and/or optical fiber 278 provides the first beam portion as the first beam and the second beam waveguide and/or optical fiber 276 provides the second beam portion as the second beam.

In an example embodiment, the first beam portion and/or second beam portion may be split (e.g., using one or more beam splitters) into multiple beams each characterized by the first and/or second wavelength and/or the first and/or second frequency, respectively. In various embodiments, the first beam portion and/or second beam portion (and/or parts thereof in embodiments where the first beam portion and/or second beam portion are split into multiple beams) may be amplified (e.g., using a transimpedance amplifier and/or the like) to a desired amplitude or power level prior to the providing of the beam portions as respective first beam(s) and second beam(s). For example, a plurality of first beam waveguides and/or optical fibers and a plurality of second beam waveguides and/or optical fibers may be configured to couple the multi-wavelength optical source 250 with respective ones of the beamforming elements 102, 108.

Example Imprinting-Shifting Component

FIG. 3 illustrates an example imprinting-shifting component 330 that may be used as an imprinting-shifting component 130, according to an example embodiment. In various embodiments, the imprinting-shifting component 330 is configured to receive a second beam, imprint frequency components of an electrical input signal on the second beam to form an imprinted beam, and adjust, modify, or shift the optical phase of the imprinted beam to form a phase-shifted imprinted beam where the induced optical phase shift corresponds to a time delay necessary for the desired beamforming.

In the illustrated embodiment, the imprinting-shifting component 330 comprises a modulator 310 and a phase shifter 320. The modulator 310 comprises an optical input configured to receive a second beam provided via a second beam waveguide and/or optical fiber 335. The modulator 310 further comprises an electrical input 315 configured to receive an electrical input signal. In various embodiments, the electrical input signal is generated and/or caused to be generated by the controller 110 and/or generated by one or more transmissions being incident on a corresponding antenna 160. For example, the modulator 310 is configured to imprint the input signal onto the second beam to form an imprinted beam that comprises the second beam as the optical carrier and frequency components of the electrical input signal converted into the optical domain. In various embodiments, the modulator 310 is an MZI modulator, electro-absorption modulator, ring modulator, and/or other amplitude or intensity modulator.

In various embodiments, the modulator 310 further comprises an optical output coupled to a waveguide and/or optical fiber 305. The waveguide and/or optical fiber 305 is configured to provide the imprinted beam coupled thereinto to the phase shifter 320. The phase shifter 320 is configured to cause the optical phase of the imprinted beam to be adjusted, shifted, modified, and/or the like to form a phase-shifted imprinted beam. For example, the phase shifter may receive a controlling signal generated and/or caused to be generated by the controller 110 configured to control the amount of phase shift imparted to the imprinted beam. In an example embodiment, the phase shifter 320 is configured to exploit the Pockels effect by changing the refractive index of a portion of the waveguide therein (e.g., based on an applied voltage input signal) and thereby change the effective optical path length. In various embodiments, the phase shifter 320 uses various electro-optic, thermo-optic, and/or mechanical effects to change the effective optical length and to impart the desired shift in phase. For example, the phase shifter 320 may be configured to use a variable resistor to affect the temperature of the waveguide or a piezo-electric actuator to affect the mechanical strain experienced by the waveguide to cause the desired phase shift.

The phase shifter 320 provides as output the phase-shifted imprinted beam by coupling the phase-shifted imprinted beam into shifted beam waveguide and/or optical fiber 340.

Example Embodiment of an Electronic Converter Element

FIG. 4 illustrates an example optical-to-electrical converter component 450 that may be used as an optical-to-electrical converter component 150 in various embodiments. the optical-to-electrical converter component 450 comprises a first photodetector 455A and a second photodetector 455B. In various embodiments, the first and second photodetectors 455A, 455B are photodiodes, photomultiplier tubes, and/or the like. In the illustrated embodiment, the first and second photodetectors 455A, 455B are in a differential configuration so as to reject common mode signal. In various embodiments, the arrangement of the first and second photodetectors 455A, 455B in a differential configuration causes reduction of noise (e.g., introduced by the photodetectors 455A, 455B, and/or the like) in the resulting (induced) electrical signal.

In the illustrated embodiment, the interference beam (generated by the multi-beam optical coupler interfering a first beam with a phase-shifted imprinted beam) is provided to the optical-to-electrical converter component 450 via interference beam waveguide and/or optical fiber 440 such that respective portions of the interference beam are incident on each of the photodetectors 455 (e.g., 455A, 455B). In an example embodiment, the multi-beam optical coupler has multiple outputs (e.g., is a 2×2 coupler comprising two outputs, and/or the like). In such an embodiment, two interference beam waveguides and/or optical fibers 440 are used such that each interference beam waveguide and/or optical fiber 440 is used to provide one of the interference beams output by the multi-beam optical coupler to a respective one of the photodetectors 455.

Responsive to the respective portion of the interference beam being incident on the photodetector 455, the photodetector generates an induced electrical signal. The induced electrical signal may be filtered, in the electrical domain, by one or more filters 480. For example, the one or more filters 480 may comprise one or more band pass filters, low pass filters, and/or high pass filters, as appropriate for the application. In an example embodiment, the one or more filters 480 are microwave filters (e.g., microwave band pass filters, microwave low pass filters, microwave high pass filters, and/or the like).

In the illustrated embodiment, the filtered induced electrical signal is provided to an amplifier 490. The amplifier 490 is configured to increase the amplitude and/or power of the filtered induced electrical signal to form the output electrical signal. In various embodiments, the optical-to-electrical converter component 450 provides the (output) electrical signal via electrical output 462. The electrical signal may be provided, via the electrical output 462, to an antenna 160 to cause the antenna to generate a corresponding transmission or to the controller 110 for processing and/or analysis.

Figure 5:
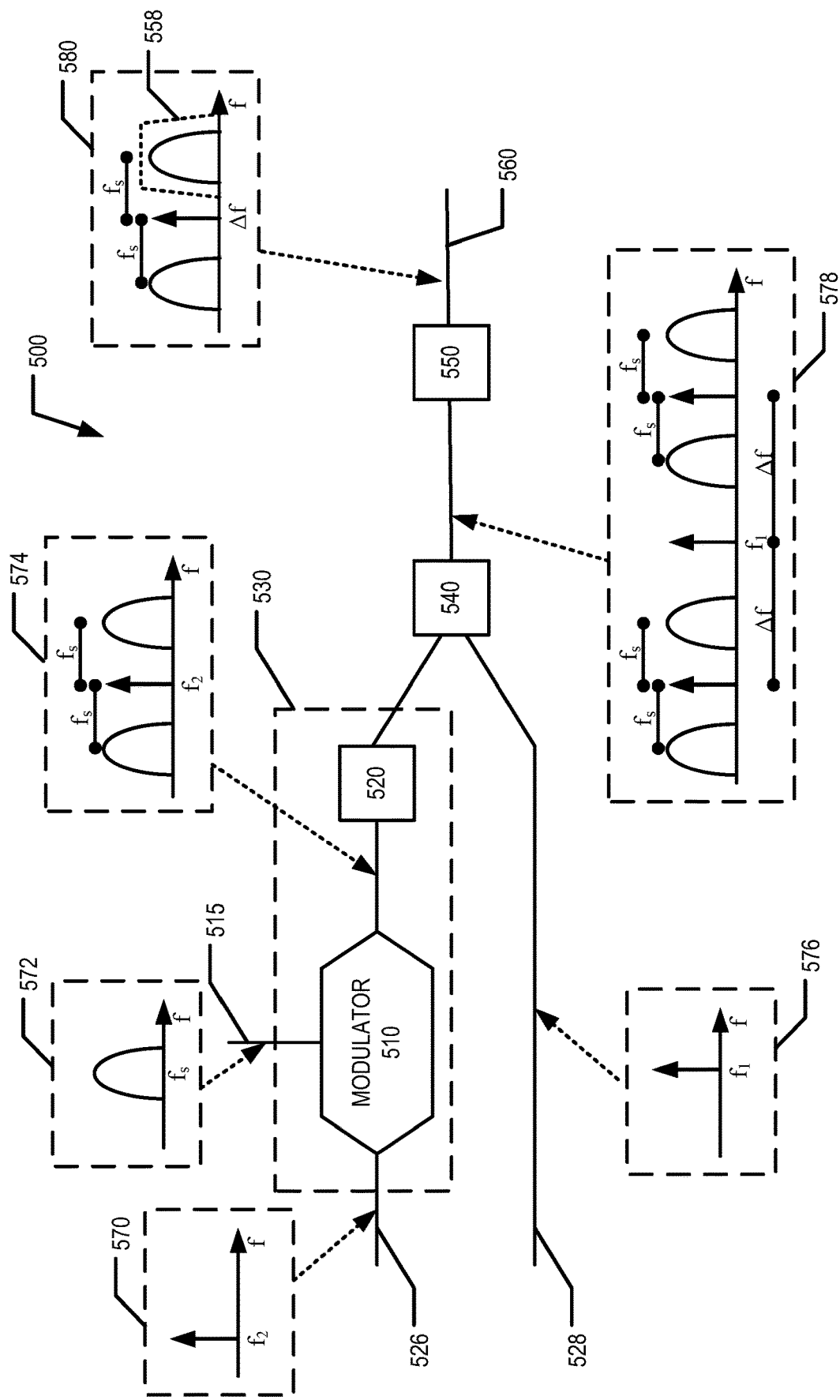
FIG. 5 is a block diagram illustrating a portion of an optical beamforming network in a downstream configuration, according to an example embodiment.

Example Single-Channel Downstream Configuration Embodiment of a Beamforming Element FIG. 5 illustrates an example embodiment of a beamforming element 500 configured for use in a downstream configuration of a beamforming system. For example, the beamforming element 500 may be used as the beamforming element 102 in an example embodiment of the downstream configuration of the beamforming system 100.

In the illustrated embodiment, the beamforming element 500 comprises a first beam waveguide and/or optical fiber 528. The first beam waveguide and/or optical fiber 528 is configured to have coupled thereinto a first beam characterized by a first wavelength and/or first frequency. For example, the multi-wavelength optical source may couple the first beam into first beam waveguide and/or optical fiber 528. Plot 576 illustrates the frequency profile of the first beam, where the horizontal axis is the frequency axis and the vertical axis indicates power and/or amplitude of the first beam. As shown in plot 576, the frequency profile of first beam includes a line and/or narrow spike at the first frequency. The first beam waveguide and/or optical fiber 528 provides the first beam to the multi-beam optical coupler 540.

In the illustrated embodiment, the beamforming element 500 comprises a second beam waveguide and/or optical fiber 526. The second beam waveguide and/or optical fiber 526 is configured to have coupled thereinto a second beam characterized by a second wavelength and/or a second frequency. For example, the multi-wavelength optical source may couple the second beam into the second beam waveguide and/or optical fiber 526. Plot 570 illustrates the frequency profile of the second beam, where the horizontal axis is the frequency axis and the vertical axis indicates power and/or amplitude of the second beam. As shown in plot 570, the frequency profile of second beam includes a line and/or narrow spike at the second frequency. As can be seen by comparing plots 570 and 576, the second frequency is less than the first frequency (e.g., $f_2 < f_1$), in an example embodiment. The second beam waveguide and/or optical fiber 528 provides the second beam to the optical input of the modulator 510 of the imprinting-shifting component 530.

In the illustrated embodiment, the beamforming element 500 comprises imprinting-shifting component 530. The imprinting-shifting component 530 comprises a modulator 510 and a phase shifter 520. In various embodiments, the modulator 510 is similar to the modulator 310 and the phase shifter 520 is similar to the phase shifter 320. The modulator 510 comprises an optical input configured to receive the second beam (e.g., via the second beam waveguide and/or optical fiber 528) and an electrical input 515 configured to receive an input signal in the electrical domain (e.g., an electrical input signal). Plot 572 illustrates an example frequency profile of the input signal, where the horizontal axis is a frequency axis and the vertical axis indicates the power or amplitude of the electrical input signal. The input signal comprises frequency components corresponding to a particular channel having a nominal frequency $f_s$, in an example embodiment. For example, the frequency of the input signal is approximately $f_s$. In other words, the frequency components of the input signal are centered around the signal frequency $f_s$. In various embodiments, the amplitude of a frequency component of the input signal is a function of time, such that information may be encoded therein. In various embodiments, the input signal is generated and/or caused to be generated by the controller 110.

In various embodiments, the modulator 510 is configured to modulate the second beam based on the electrical input signal such that frequency components of the input signal are imprinted onto the second beam in the optical domain. The imprinted beam is provided via the optical output of the modulator 510 such that the imprinted beam is received by an optical input of the phase shifter 520. Plot 574 illustrates the frequency profile of the imprinted beam, where the horizontal axis is the frequency axis and the vertical axis indicates power and/or amplitude of the imprinted beam. As can be seen in plot 574, the imprinted beam comprises the line or narrow spike at the second frequency and side lobes that encode the time-dependent amplitude of the frequency components of the electrical input signal. The side lobes are separated from the line or narrow spike of the second frequency by the signal frequency $f_s$.

The phase shifter 520 receives the imprinted beam and adjusts, shifts, modifies, and/or the like the optical phase of the imprinted beam to form a phase-shifted imprinted beam. For example, the phase shifter 520 may impart an optical phase shift to the imprinted beam to form a phase-shifted imprinted beam. In various embodiments, the size, amplitude, and/or amount of the phase shift imparted to the optical phase of the imprinted beam is controlled via the application of a controlling signal to the phase shifter 520 that was generated by and/or caused to be generated by the controller 110. In various embodiments, the phase shift imparted to the imprinted beam is determined (e.g., by the controller 110) based on the expected direction of an intended recipient device with respect to the antenna array of the beamforming system 100.

In various embodiments, the phase shifter 520 is configured to generally not affect the frequency profile of the imprinted beam. Thus, the phase-shifted imprinted beam is substantially the same as that of the imprinted beam (e.g., as illustrated in plot 574).

The phase shifter 520 couples the phase-shifted imprinted beam into a waveguide and/or optical fiber that provides the phase-shifted imprinted beam to the multi-beam optical coupler 540.

The multi-beam optical coupler 540 is configured to receive the phase-shifted imprinted beam and the first beam and to cause the phase-shifted imprinted beam and the first beam to interact and/or interfere with one another to form an interference beam. For example, the multi-beam optical coupler 540 may be similar to the multi-beam optical coupler 140.

Plot 578 illustrates the frequency profile of the interference beam, where the horizontal axis is the frequency axis and the vertical axis represents amplitude or power of the interference beam. As can be seen in plot 578, the frequency profile of the interference beam includes a line or narrow spike at the first frequency $f_1$ and lines or narrow spikes located at the particular frequency difference $\Delta f(f_1 - f_2 = \Delta f)$ above and below the first frequency $f_1$. The interference beam further includes the time-dependent frequency components of the electrical input signal that were imprinted onto the second beam spaced apart from the lines or narrow spikes located at the particular frequency difference Δf by a frequency difference of the signal frequency $f_s$.

The interference beam is then provided (e.g., via an appropriate waveguide and/or optical fiber) to the optical-to-electrical converter component 550. For example, the optical-to-electrical converter component 550 comprises one or more photodetectors, in various embodiments. For example, in various embodiments, the optical-to-electrical converter component 550 is similar to the optical-to-electrical converter component 450. For example, the interference beam (and/or a portion thereof) is incident on each respective photodetector of the optical-to-electrical converter component 550 and an induced electrical signal is generated responsive thereto. The induced electrical signal may be filtered and/or amplified before the resulting output electrical signal is provided (via electrical output 560) to a respective antenna of an antenna array of the beamforming system of which the beamforming element 500 is apart.

Plot 580 illustrates the frequency profile (in the electrical domain) of the induced electrical signal generated by the interference beam being incident on the photodetectors of the optical-to-electrical converter component 550, where the horizontal axis is a frequency axis and the vertical axis indicates a power and/or amplitude of the induced electrical signal. The frequency profile includes a line or narrow spike at the beat frequency of the interference pattern caused by interfering the first beam and the second beam (which is equivalent to the particular frequency difference Δf). The frequency profile further includes a representation of the frequency components of the input signal spaced apart from the beat frequency by the signal frequency $f_s$. As shown in plot 580, a band pass filter 558 (e.g., an electronic microwave band pass filter) may be used to filter the electrical signal such that only the higher frequency representation of the frequency components of the input signal are passed to the electrical output 560. In an example embodiment, the bandpass filter 558 is a component and/or part of the optical-to-electrical converter component 550. In an example embodiment, the bandpass filter 558 corresponds to the channel and/or frequency range at which the antenna array of the beamforming system is configured to operate. Thus, the electrical signal includes the time-dependent information encoded in the input signal provided to the electrical input 515 of the modulator 510 at an up-converted frequency of $f_s+\Delta f$. Moreover, the electrical signal has been time delayed, with respect to the respective electrical signals generated by other beamforming elements 500 of the beamforming system, such that when the respective electrical signals are provided to the respective antennas of the antenna array of the beamforming system, the desired beamforming is obtained and/or performed.

Figure 6:
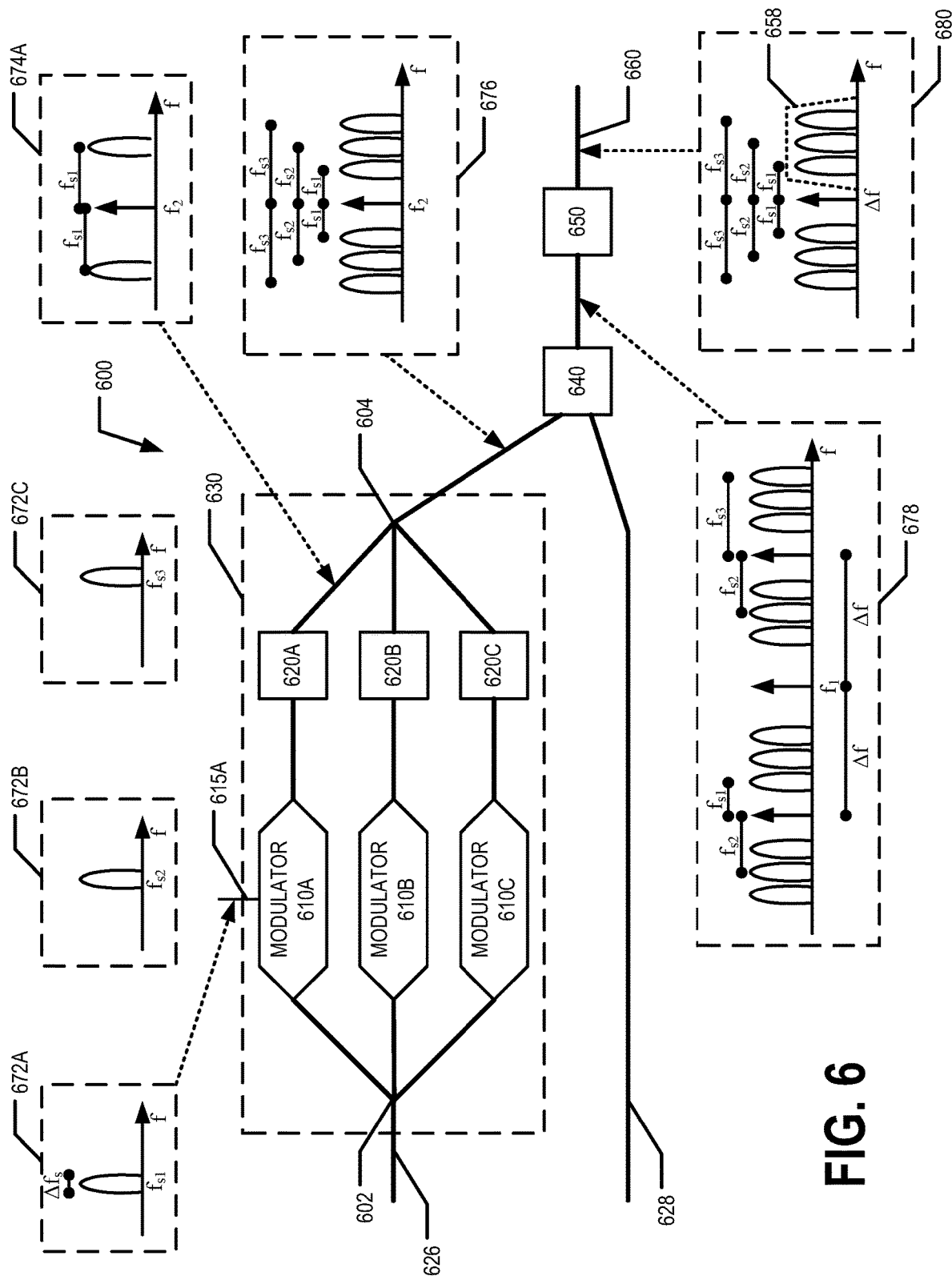
FIG. 6 is a block diagram illustrating a multi-channel optical beamforming network in an upstream configuration, according to an example embodiment.

Example Multi-Channel Downstream Configuration Embodiment of a Beamforming Element FIG. 6 illustrates an example embodiment of a beamforming element 600 configured for use in a downstream configuration of a beamforming system that operates at a plurality of channels, frequency ranges, and/or frequency bands (e.g., M channels, frequency ranges, and/or frequency bands). While FIG. 6 illustrates an embodiment configured for use with three channels, frequency ranges, and/or frequency bands, various embodiments may be configured for use with various numbers of channels, frequency ranges, and/or frequency bands, as appropriate for the application. For example, the beamforming element 600 may be used as the beamforming element 102 in an example embodiment of the downstream configuration of the beamforming system 100.

In the illustrated embodiment, the beamforming element 600 comprises a first beam waveguide and/or optical fiber 628. The first beam waveguide and/or optical fiber 628 is configured to have coupled thereinto a first beam characterized by a first wavelength and/or first frequency. For example, the multi-wavelength optical source may couple the first beam into first beam waveguide and/or optical fiber 628. In general, the frequency profile of the first beam includes a line or narrow spike at the first frequency. The first beam waveguide and/or optical fiber 628 provides the first beam to the multi-beam optical coupler 640.

In the illustrated embodiment, the beamforming element 600 comprises a second beam waveguide and/or optical fiber 626. The second beam waveguide and/or optical fiber 626 is configured to have coupled thereinto a second beam characterized by a second wavelength and/or a second frequency. For example, the multi-wavelength optical source may couple the second beam into the second beam waveguide and/or optical fiber 626. The frequency profile of second beam generally includes a line and/or narrow spike at the second frequency. In an example embodiment, the second frequency is less than the first frequency (e.g., $f_2<f_1$). The second beam waveguide and/or optical fiber 628 provides the second beam to the optical input of the imprinting-shifting component 630.

In the illustrated embodiment, the beamforming element 600 comprises imprinting-shifting component 630. The imprinting-shifting component 630 comprises a beam splitter 602, a beam combiner 604, a plurality of modulators 610 (e.g., 610A, 610B, 610C), such as M modulators 610, and a plurality of phase shifters 620 (e.g., 620A, 620B, 620C), such as M phase shifters 620. In various embodiments, the beam splitter 602 is similar to the beam splitters described above with respect to the multi-wavelength optical source and/or the beam combiner 604 may be similar to the multi-beam optical coupler 140. In various embodiments, each of the modulators 610A, 610B, 610C is similar to the modulator 310 and each of the phase shifters 620A, 620B, 620C is similar to the phase shifter 320. In various embodiments, the modulators 610 of the plurality of modulators are each paired with a respective phase shifter 620 of the plurality of phase shifters. For example, the first modulator 610A is considered paired with the first phase shifter 620A because the first modulator 610A and the first phase shifter 620A are on the same optical path. However, the first modulator 610A is not considered paired with the second phase shifter 620B because the first modulator 610A and the second phase shifter 620B are not on the same optical path. In various embodiments, the imprinting-shifting component 630 comprises as many pairs of modulators 610 and phase shifters 620 as the number of channels at which the beamforming system is configured to operate. For example, in an example embodiment the beamforming system is configured to transmit and/or receive transmissions via M different channels (or frequency ranges or frequency bands) and the imprinting-shifting component 630 of a beamforming element 600 of the beamforming system comprise M pairs of modulators 610 and phase shifters 620.

In an example embodiment, the beam splitter 602 is configured to receive the second beam (e.g., via the second beam waveguide and/or optical fiber 626) and split the second beam into M second beams (in the illustrated embodiment, M=3). For example, the imprinting-shifting component 630 may include M beam paths, each of the M beam paths corresponding to a respective channel, frequency range, and/or frequency band, and with each beam path comprising a respective modulator 610 and a respective phase shifter 620. In an example embodiment, imprinting-shifting component 630 may include one or more optical amplifiers upstream and/or downstream of the beam splitter 602. For example, in an example embodiment, each of the M beam paths of the imprinting-shifting component 630 comprises an optical amplifier. In an example embodiment, the imprinting-shifting component 630 does not include any amplifiers.

A respective one of the M second beams is provided to each respective modulator-phase shifter pair. For example, a respective one of the M second beams is provided to the first modulator 610A, which imprints a first electrical input signal therein to form a first imprinted beam and provides the first imprinted beam to the first phase shifter 620A, which imparts a first optical phase shift to the first imprinted beam to form a first phase-shifted imprinted beam. Similarly, another one of the M second beams is provided to the second modulator 610B, which imprints a second electrical input signal therein to form a second imprinted beam and provides the second imprinted beam to the second phase shifter 620B, which imparts a second optical phase shift to the second imprinted beam to form a second phase-shifted imprinted beam. In various embodiments, the respective electrical input signals are generated and/or caused to be generated by the controller 110.

In various embodiments, each modulator 610 comprises a respective optical input configured to receive a respective one of the second beams (e.g., after the splitting of the second beam provided via the second beam waveguide and/or optical fiber 628 via beam splitter 602) and a respective electrical input 615 configured to receive a respective electrical input signal in the electrical domain. Plot 672A illustrates an example frequency profile of a first input signal that is applied to the electrical input 615A of the first modulator 610A, where the horizontal axis is a frequency axis and the vertical axis indicates the power or amplitude of the first electrical input signal. The first input signal comprises frequency components corresponding to a first channel having a nominal frequency $f_{s1}$, in an example embodiment. For example, the frequency of the first input signal is approximately $f_{s1}$. In other words, the frequency components of the first input signal are centered around the signal frequency $f_{s1}$. Plot 672B illustrates an example frequency profile of a second electrical input signal that is applied to the electrical input (not shown for clarity) of the second modulator 610B. The second electrical input signal comprises frequency components corresponding to a second channel having a nominal frequency $f_{s2}$, in an example embodiment. For example, the frequency of the second electrical input signal is approximately $f_{s2}$. In other words, the frequency components of the second electrical input signal are centered around the signal frequency $f_{s2}$. Plot 672C illustrates an example frequency profile of a third electrical input signal that is applied to the electrical input (not shown for clarity) of the third modulator 610C. The third electrical input signal comprises frequency components corresponding to a third channel having a nominal frequency $f_{s3}$, in an example embodiment. For example, the frequency of the third electrical input signal is approximately $f_{s3}$. In other words, the frequency components of the third electrical input signal are centered around the signal frequency $f_{s3}$.

As can be seen by comparing plots 672A, 672B, 672C, and/or by plot 676A, for example, in various embodiments, the respective frequency profiles of the first, second, and third electrical input signals to do not overlap with one another at non-zero amplitude. In other words, the nominal frequencies of the first, second, and third channels $f_{s1}$, $f_{s2}$, $f_{s3}$ are separated from one another by at least the frequency width of the channels. In other words, when the frequency profile of the respective channels have a width of $\Delta f_s$ and/or the respective frequency ranges corresponding to the channels correspond to a frequency range of size $\Delta f_s$, the central and/or nominal frequencies of adjacent and/or immediately neighboring channels are separated by at least $\Delta f_s$ (e.g., $f_{s2}-f_{s1} \geq \Delta f_s$, $f_{s3}-f_{s2} \geq \Delta f_s$). In various embodiments, the amplitudes of the frequency components of the respective electrical input signals are a function of time, such that information may be encoded therein.

In various embodiments, each modulator 610 is configured to modulate a respective second beam based on the respective electrical input signal such that the frequency components of the respective electrical input signal are imprinted onto the respective second beam in the optical domain. The imprinted beam is provided via the optical output of the respective modulator 610 such that the respective imprinted beam is received by an optical input of the respective phase shifter 620. For example, the first modulator 610A generates a first imprinted beam by imprinting the frequency components of the first electrical input signal into a respective second beam to form the first imprinted beam (e.g., by modulating the second beam based on the first electrical input signal) that is provided to the first phase shifter 620A. Similarly, the second modulator 610B generates a second imprinted beam by imprinting the second input signal into a respective second beam to form the second imprinted beam that is provided to the second phase shifter 620B. Plot 674A illustrates the frequency profile of the first imprinted beam, where the horizontal axis is the frequency axis and the vertical axis indicates power and/or amplitude of the first imprinted beam. As can be seen in plot 674A, the first imprinted beam comprises the line or narrow spike at the second frequency and side lobes that encode the time-dependent amplitude of the frequency components of the first electrical input signal. The side lobes are separated from the line or narrow spike of the second frequency by the first signal frequency $f_{s1}$. The frequency beam of the second and third imprinted beams are similar to the frequency profile of the first imprinted beam, but with the side lobes that encode the time-dependent amplitude of the frequency components of the respective one of second or third electrical input signal separated from the line or narrow spike of the second frequency $f_2$ by the respective one of the second or third signal frequency $f_{s2}$, $f_{s3}$.

The respective phase shifters 620 each receive the respective imprinted beam and adjust, shift, modify, and/or the like the optical phase of the respective imprinted beam to form a respective phase-shifted imprinted beam. For example, the respective phase shifter 620 may impart a respective optical phase shift to the respective imprinted beam to form a respective phase-shifted imprinted beam. For example, the first phase shifter 620A receives the first imprinted beam and imparts a first optical phase shift to the first imprinted beam to form a first phase-shifted imprinted beam. Similarly, the second phase shifter 620B receives the second imprinted beam and imparts a second optical phase shift to the second imprinted beam to form a second phase-shifted imprinted beam.

In various embodiments, the size, amplitude, and/or amount of a respective phase shift imparted to a respective optical phase of a respective imprinted beam is controlled via the application of a respective controlling signal to the respective phase shifter 620 that was generated by and/or caused to be generated by the controller 110. In various embodiments, the respective phase shifts imparted to the respective imprinted beams by the respective phase shifters 620 are independently controlled. For example, the first phase shifter 620A is controlled (e.g., by the controller 110) to impart a first optical phase shift $\varphi_1$ to the first imprinted beam and the second phase shifter 620B is controlled (e.g. by the controller 110) to impart a second optical phase shift $\varphi_2$ to the second imprinted beam, with the first optical phase shift $\varphi_1$ and the second optical phase shift $\varphi_2$ being independently controlled.

In various embodiments, the phase shift imparted to a respective imprinted beam is determined (e.g., by the controller 110) based on the expected direction of an intended recipient device with respect to the antenna array of the beamforming system 100. For example, a first recipient device may be communicating with the controller 110 of the beamforming system 100 using the first channel and a second recipient device may be communicating with the controller 110 using the second channel. The first recipient device is located in a first direction from the antenna array and the second recipient device is located in a second direction from the antenna array. Therefore, the beamforming system 100 may transmit and/or emit a transmission that primarily directs the portion (of the frequency profile) of the transmission in the first channel in the first direction toward the first recipient device and that primarily directs the portion (of the frequency profile) of the transmission in the second channel in the second direction toward the second recipient device. Additional recipient devices may be similarly accommodated, with each channel being independently directed based on the corresponding phase shift applied to each respective imprinted beam by the respective beamforming elements 600.

In various embodiments, the respective phase shifters 620 are configured to generally not affect the respective frequency profile of the respective imprinted beam. Thus, the frequency profile of the respective phase-shifted imprinted beam is substantially the same as that of the respective imprinted beam. For example, the frequency profile of the first phase-shifted imprinted beam is substantially the same as that of the first imprinted beam (e.g., as illustrated in plot 674A).

Each of the respective phase shifters 620 couples the respective phase-shifted imprinted beam into a respective waveguide and/or optical filter configured to provide the respective phase-shifted imprinted beam to the beam combiner 604. In various embodiments, the beam combiner 604 receives the M phase-shifted imprinted beams and combines them into a combined phase-shifted imprinted beam. As each of the M phase-shifted imprinted beams contains information (in the form of the imprinted respective input signal) that is imprinted and/or encoded at a different channel, frequency range, and/or frequency band (that does not overlap in the frequency domain with any of the other channels, frequency ranges, and/or frequency bands used by the beamforming system 100), combining of the respective phase-shifted imprinted beams does not lead to interference between the respective channels, frequency ranges, and/or frequency bands and does not cause scrambling of information encoded by the respective channels, frequency ranges, and/or frequency bands. Plot 676 illustrates the frequency profile of the combined phase-shifted imprinted beam, with the horizontal axis being a frequency axis and the vertical axis indicating power and/or amplitude of the combined phase-shifted imprinted beam. As can be seen in plot 676, the combined phase-shifted imprinted beam comprises the line or narrow spike at the second frequency and respective side lobes that encode the time-dependent amplitude of the respective frequency components of respective electrical input signals. For example, first side lobes corresponding to the first channel and/or first frequency range are separated from the line or narrow spike of the second frequency by the first signal frequency $f_{s1}$, second side lobes corresponding to the second channel and/or second frequency range are separated from the line or narrow spike of the second frequency by the second signal frequency $f_{s2}$, and third side lobes corresponding to the third channel and/or third frequency range are separated from the line or narrow spike of the second frequency by the third signal frequency $f_{s3}$.

The beam combiner 604 couples the combined phase-shifted imprinted beam into a waveguide and/or optical fiber configured to provide the combined phase-shifted imprinted beam to the multi-beam optical coupler 640.

The multi-beam optical coupler 640 is configured to receive the combined phase-shifted imprinted beam and the first beam and to cause the combined phase-shifted imprinted beam and the first beam to interact and/or interfere with one another to form an interference beam. For example, the multi-beam optical coupler 640 may be similar to the multi-beam optical coupler 140.

Plot 678 illustrates the frequency profile of the interference beam, where the horizontal axis is the frequency axis and the vertical axis represents amplitude or power of the interference beam. As can be seen in plot 678, the frequency profile of the interference beam includes a line or narrow spike at the first frequency $f_1$ and lines or narrow spikes located at the particular frequency difference $\Delta f(f_1-f_2=\Delta f)$ above and below the first frequency $f_1$. The interference beam further includes the respective time-dependent frequency components of the respective electrical input signal that were imprinted onto the respective second beams with the respective frequency components spaced apart from the lines or narrow spikes located at the particular frequency difference $\Delta f$ above and below the first frequency by the respective signal frequencies. For example, the frequency profile of the interference beam includes side lobes located at $f_{s1}$ from the line or narrow spike located at the particular frequency difference $\Delta f$ above and below the first frequency that each encode the time-dependent frequency components of the first electrical input signal. Similarly, the frequency profile of the interference beam includes side lobes located at $f_{s2}$ from the line or narrow spike located at the particular frequency difference $\Delta f$ above and below the first frequency that each encode the time-dependent frequency components of the second electrical input signal, and side lobes located at $f_{s3}$ from the line or narrow spike located at the particular frequency difference $\Delta f$ above and below the first frequency that each encode the time-dependent frequency components of the third electrical input signal. Thus, the interference beam encodes the time-dependent frequency components of each of the respective input signals and each individually configured to channel and/or frequency range particular beamforming.

The interference beam is then provided (e.g., via an appropriate waveguide and/or optical fiber) to the optical-to-electrical converter component 650. For example, the optical-to-electrical converter component 650 comprises one or more photodetectors, in various embodiments. For example, in various embodiments, the optical-to-electrical converter component 650 is similar to the optical-to-electrical converter component 450. For example, the interference beam (and/or a respective portion thereof) is incident on each respective photodetector of the optical-to-electrical converter component 650 and an induced electrical signal is generated responsive thereto. The induced electrical signal may be filtered and/or amplified before the resulting electrical signal is provided (via electrical output 660) to a respective antenna of an antenna array of the beamforming system of which the beamforming element 600 is apart.

Plot 680 illustrates the frequency profile (in the electrical domain) of the induced electrical signal generated by the interference beam being incident on the photodetectors of the optical-to-electrical converter component 650. The frequency profile includes a line or narrow spike at the beat frequency of the interference pattern caused by interfering the first beam and the second beam (which is equivalent to the particular frequency difference $\Delta f$). The frequency profile further includes respective representations of the frequency components of the respective electrical input signals spaced apart from the beat frequency by the respective signal frequencies. As shown in plot 680, a band pass filter 658 (e.g., an electronic microwave band pass filter) may be used to filter the electrical signal such that only the higher frequency representation of the respective frequency components of the respective input signal are passed to the electrical output 660 as the output electrical signal. Thus, the output electrical signal includes the time-dependent information encoded in the respective electrical input signals provided to the respective electrical inputs 615 of the respective modulators 610 at an up-converted frequency. For example the time-dependent information encoded in the first electrical input signal provided to the electrical input 615A of the first modulator 610A is present in the (output) electrical signal at $f_{s1}+\Delta f$ and the time-dependent information encoded in the second electrical input signal provided to the electrical input of the second modulator 610B is present in the (output) electrical signal at $f_{s2}+\Delta f$. Moreover, each frequency component the electrical signal has been (independently) time delayed, with respect to the respective frequency components of respective electrical signals generated by other beamforming elements 600 of the beamforming system, such that when the respective electrical signals are provided to the respective antennas of the antenna array of the beamforming system, the desired beamforming is obtained for each channel, frequency range, and/or frequency band.

Figure 7:
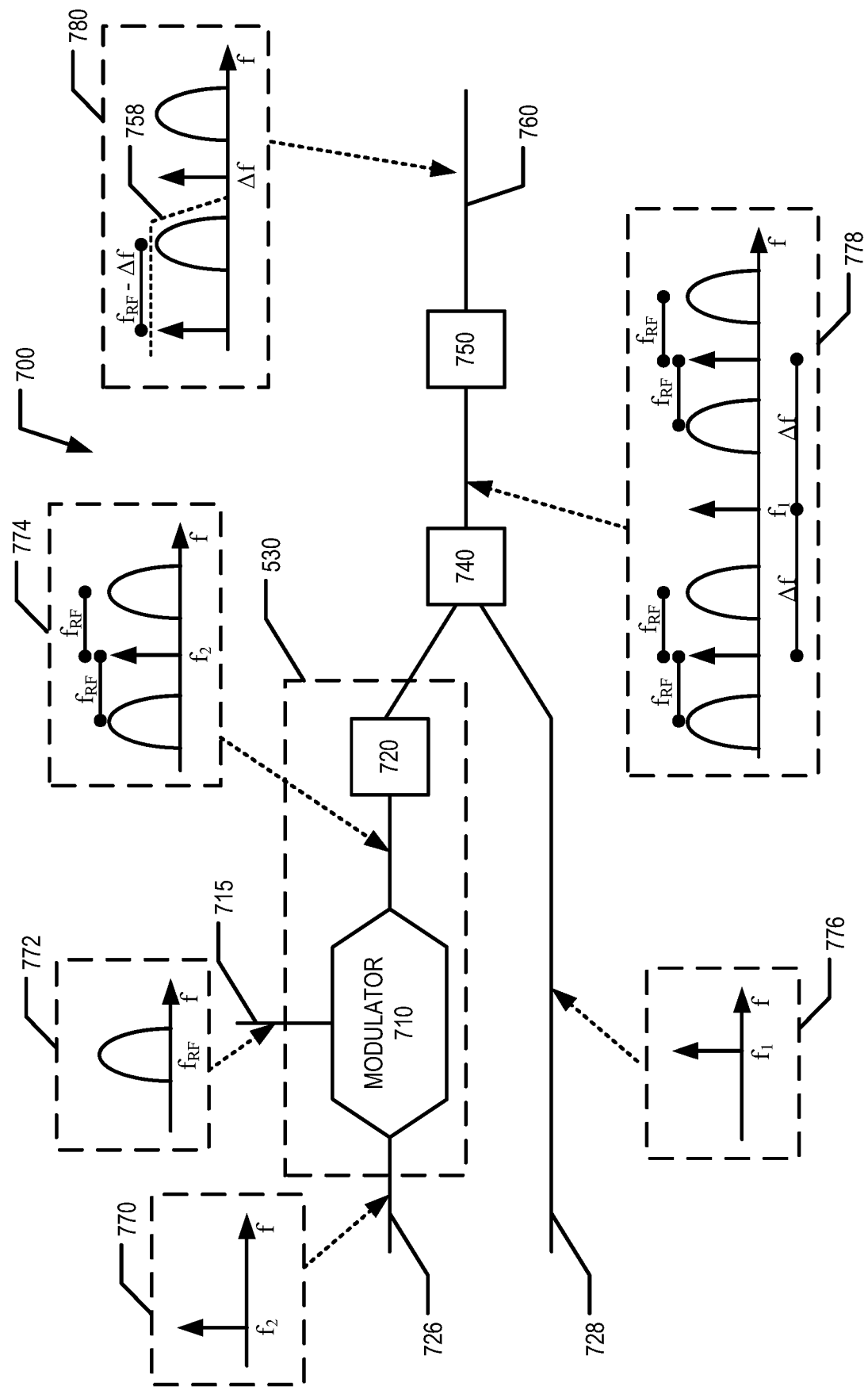
FIG. 7 is a block diagram illustrating an optical beamforming network in an upstream configuration, according to an example embodiment.

Example Single-Channel Upstream Configuration Embodiment of a Beamforming Element FIG. 7 illustrates an example embodiment of a beamforming element 700 configured for use in an upstream configuration of a beamforming system. For example, the beamforming element 700 may be used as the beamforming element 108 in an example embodiment of the upstream configuration of the beamforming system 105.

In the illustrated embodiment, the beamforming element 700 comprises a first beam waveguide and/or optical fiber 728. The first beam waveguide and/or optical fiber 728 is configured to have coupled thereto a first beam characterized by a first wavelength and/or first frequency. For example, the multi-wavelength optical source may couple the first beam into first beam waveguide and/or optical fiber 728. Plot 776 illustrates the frequency profile of the first beam, where the horizontal axis is the frequency axis and the vertical axis indicates power and/or amplitude of the first beam. As shown in plot 776, the frequency profile of first beam includes a line and/or narrow spike at the first frequency. The first beam waveguide and/or optical fiber 728 provides the first beam to the multi-beam optical coupler 740.

In the illustrated embodiment, the beamforming element 700 comprises a second beam waveguide and/or optical fiber 726. The second beam waveguide and/or optical fiber 726 is configured to have coupled thereto a second beam characterized by a second wavelength and/or a second frequency. For example, the multi-wavelength optical source may couple the second beam into the second beam waveguide and/or optical fiber 726. Plot 770 illustrates the frequency profile of the second beam, where the horizontal axis is the frequency axis and the vertical axis indicates power and/or amplitude of the second beam. As shown in plot 770, the frequency profile of second beam includes a line and/or narrow spike at the second frequency. As can be seen by comparing plots 770 and 776, the second frequency is less than the first frequency (e.g., $f_2<f_1$), in an example embodiment. The second beam waveguide and/or optical fiber 728 provides the second beam to the optical input of the modulator 710 of the imprinting-shifting component 730.

In the illustrated embodiment, the beamforming element 700 comprises imprinting-shifting component 730. The imprinting-shifting component 730 comprises a modulator 710 and a phase shifter 720, in the illustrated embodiment. In various embodiments, the modulator 710 is similar to the modulator 310 and the phase shifter 720 is similar to the phase shifter 320. The modulator 710 comprises an optical input configured to receive the second beam (e.g., via the second beam waveguide and/or optical fiber 728) and an electrical input 715 configured to receive an input electrical signal. Plot 772 illustrates an example frequency profile of the electrical input signal, where the horizontal axis is a frequency axis and the vertical axis indicates power or amplitude of the electrical input signal. The electrical input signal comprises frequency components corresponding to a received transmission having a nominal frequency $f_{RF}$, in an example embodiment. For example, the frequency of the electrical input signal is approximately $f_{RF}$. In other words, the frequency components of the electrical input signal are centered around the received frequency $f_{RF}$. In various embodiments, the amplitude of the frequency components of the input signal is a function of time, such that information may be encoded therein. In various embodiments, the electrical input signal is generated by a (radio frequency) transmission being incident on a respective antenna of the antenna array.

In various embodiments, the modulator 710 is configured to modulate the second beam based on the electrical input signal such that the electrical input signal is imprinted onto the second beam in the optical domain to from an imprinted beam. The imprinted beam is provided via the optical output of the modulator 710 such that the imprinted beam is received by an optical input of the phase shifter 720. Plot 774 illustrates the frequency profile of the imprinted beam, where the horizontal axis is the frequency axis and the vertical axis indicates power and/or amplitude of the imprinted beam. As can be seen in plot 774, the imprinted beam comprises the line or narrow spike at the second frequency $f_2$ and side lobes that encode the time-dependent amplitude of the frequency components of the electrical input signal. The side lobes are separated from the line or narrow spike of the second frequency by the received frequency $f_{RF}$.

The phase shifter 720 receives the imprinted beam and adjusts, shifts, modifies, and/or the like the optical phase of the imprinted beam to form a phase-shifted imprinted beam.

For example, the phase shifter 720 may impart an optical phase shift to the imprinted beam to form a phase-shifted imprinted beam. In various embodiments, the size, amplitude, and/or amount of the phase shift imparted to the optical phase of the imprinted beam is controlled via the application of a controlling signal to the phase shifter 720 that was generated by and/or caused to be generated by the controller 110. In various embodiments, the phase shift imparted to the imprinted beam is determined (e.g., by the controller 110) based on an expected direction of a device that generated and/or emitted the transmission that was incident on the respective antenna to cause the generation of the input signal.

In various embodiments, the phase shifter 720 is configured to generally not affect the frequency profile of the imprinted beam. Thus, the phase-shifted imprinted beam is substantially the same as that of the imprinted beam (e.g., as illustrated in plot 774).

The phase shifter 720 couples the phase-shifted imprinted beam into a waveguide and/or optical fiber that provides the phase-shifted imprinted beam to the multi-beam optical coupler 740.

The multi-beam optical coupler 740 is configured to receive the phase-shifted imprinted beam and the first beam and to cause the phase-shifted imprinted beam and the first beam to interact and/or interfere with one another to form an interference beam. For example, the multi-beam optical coupler 740 may be similar to the multi-beam optical coupler 140.

Plot 778 illustrates the frequency profile of the interference beam, where the horizontal axis is the frequency axis and the vertical axis represents amplitude or power of the interference beam. As can be seen in plot 778, the frequency profile of the interference beam includes a line or narrow spike at the first frequency $f_1$ and lines or narrow spikes located at the particular frequency difference $\Delta f(f_1-f_2=\Delta f)$ above and below the first frequency $f_1$. The interference beam further includes the time-dependent frequency components of the input signal that were imprinted onto the second beam spaced apart from the lines or narrow spikes located at the particular frequency difference $\Delta f$ above and below the first frequency by the received frequency $f_{RF}$.

The interference beam is then provided (e.g., via an appropriate waveguide and/or optical fiber) to the optical-to-electrical converter component 750. For example, the optical-to-electrical converter component 750 comprises one or more photodetectors, in various embodiments. For example, in various embodiments, the optical-to-electrical converter component 750 is similar to the optical-to-electrical converter component 450. For example, the interference beam (and/or a respective portion thereof) is incident on each respective photodetector of the optical-to-electrical converter component 750 and an induced electrical signal is generated responsive thereto. The induced electrical signal may be filtered and/or amplified before the resulting output electrical signal is provided (via electrical output 760) to the controller 110 of the beamforming system 105, for example.

Plot 780 illustrates the frequency profile (in the electrical domain) of the induced electrical signal generated by the interference beam being incident on the photodetectors of the optical-to-electrical converter component 750. The frequency profile includes a line or narrow spike at the beat frequency of the interference pattern caused by interfering the first beam and the second beam (which is equivalent to the particular frequency difference $\Delta f$). The frequency profile further includes a representation of the frequency components of the electrical input signal spaced apart from the beat frequency by the received frequency $f_{RF}$. As shown in plot 780, a low pass filter 758 (e.g., an electronic microwave low pass filter) may be used to filter the electrical signal such that only the lower frequency representation of the frequency components of the electrical input signal are passed to the electrical output 760 as the output electrical signal. In an example embodiment, the low pass filter 758 is a component and/or part of the optical-to-electrical converter component 750. In an example embodiment, the low pass filter 758 corresponds to the channel and/or frequency range at which the antenna array of the beamforming system 105 is configured to operate. Thus, the electrical signal includes the time-dependent information encoded in the input signal provided to the electrical input 715 of the modulator 710 at a down-converted frequency of $f_{RF}-\Delta f$. Moreover, the electrical signal has been time delayed, with respect to the respective electrical signals received by other beamforming elements 700 of the beamforming system, such that when the respective electrical signals are processed and/or analyzed by controller 110, the desired beamforming analysis can be performed.

As should be understood from FIGS. 5 and 7, the architectures of the example beamforming element 500 and the example beamforming element 700 are similar with differences only in the origin of the electrical input signal provided to the electrical input 515, 715 of the respective modulators 510, 710 and the recipient of the electrical signal provided by the respective electrical outputs 560, 760.

Figure 8:
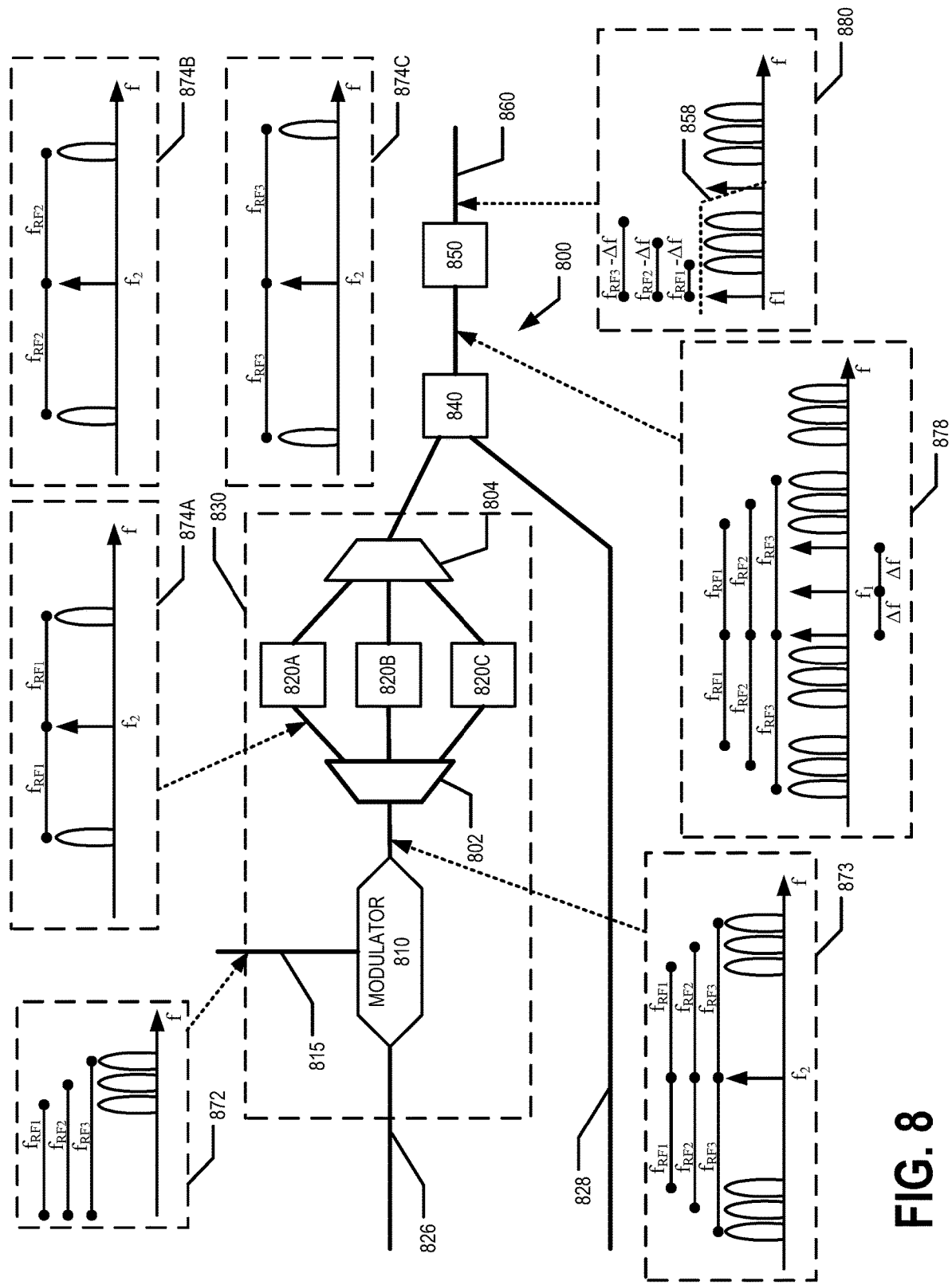
FIG. 8 is a block diagram illustrating a multi-channel optical beamforming network in an upstream configuration, according to an example embodiment.
Figure 9:
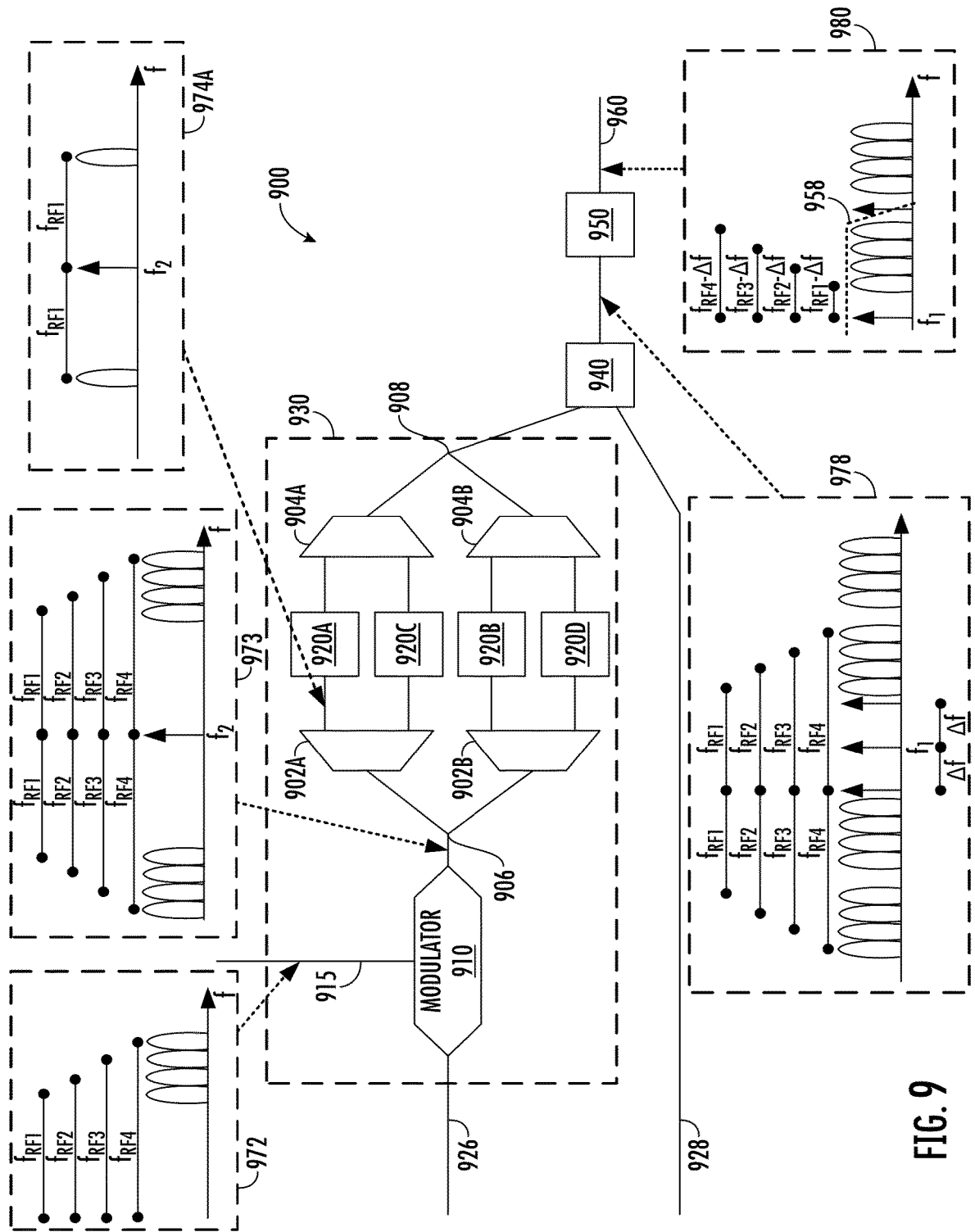
FIG. 9 is a block diagram illustrating a multi-wavelength optical beamforming network in an upstream configuration, according to another example embodiment.
Figure 10:
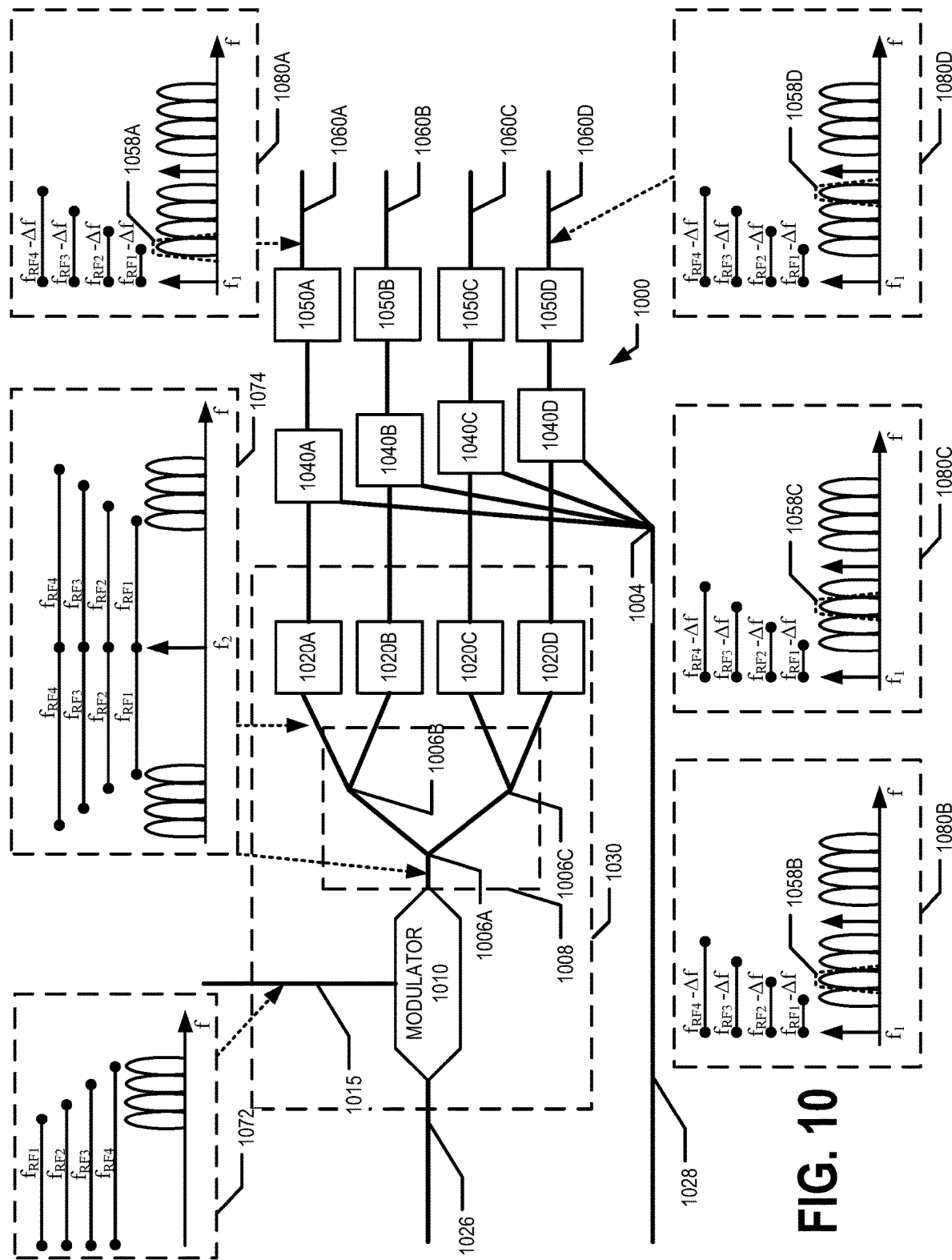
FIG. 10 is a block diagram illustrating a multi-wavelength optical beamforming network in an upstream configuration, according to yet another example embodiment.

Example Multi-Channel Upstream Configuration Embodiments of a Beamforming Element FIGS. 8, 9, and 10 illustrate various embodiments of example multi-channel beamforming elements that may be used, for example, in various embodiments of a beamforming system 105.

FIG. 8 illustrates an example embodiment of a beamforming element 800 configured for use in an upstream configuration of a beamforming system that operates at a plurality of channels, frequency ranges, and/or frequency bands. While FIG. 8 illustrates an embodiment configured for use with three channels or frequency ranges, various embodiments may be configured for use with various numbers of channels, frequency ranges, and/or frequency bands as appropriate for the application. For example, the beamforming element 800 may be configured for use with M channels, frequency ranges, and/or frequency bands, with M being a positive integer. For example, the beamforming element 800 may be used as the beamforming element 108 in an example embodiment of the upstream configuration of the beamforming system 105.

In the illustrated embodiment, the beamforming element 800 comprises a first beam waveguide and/or optical fiber 828. The first beam waveguide and/or optical fiber 828 is configured to have coupled thereto a first beam characterized by a first wavelength and/or first frequency. For example, the multi-wavelength optical source may couple the first beam into first beam waveguide and/or optical fiber 828. In general, the frequency profile of the first beam includes a line or narrow spike at the first frequency. The first beam waveguide and/or optical fiber 828 provides the first beam to the multi-beam optical coupler 840.

In the illustrated embodiment, the beamforming element 800 comprises a second beam waveguide and/or optical fiber 826. The second beam waveguide and/or optical fiber 826 is configured to have coupled thereto a second beam characterized by a second wavelength and/or a second frequency.

For example, the multi-wavelength optical source may couple the second beam into the second beam waveguide and/or optical fiber 826. The frequency profile of second beam generally includes a line and/or narrow spike at the second frequency. In an example embodiment, the second frequency is less than the first frequency (e.g., $f_2<f_1$). The second beam waveguide and/or optical fiber 828 provides the second beam to the optical input of the imprinting-shifting component 830.

In the illustrated embodiment, the beamforming element 800 comprises imprinting-shifting component 830. The imprinting-shifting component 830 comprises a modulator 810, a splitting optical filtering element 802, a plurality of phase shifters 820 (e.g., 820A, 820B, 820C), and a combining optical filtering element 804. In various embodiments, the modulator 810 is similar to the modulator 310 and each of the phase shifters 820A, 820B, 820C is similar to the phase shifter 320. In various embodiments, the splitting optical filtering element 802 and/or the combining optical filtering element 804 are respective AWGs. In an example embodiment, the combining optical filtering element 804 is a beam combiner (e.g., similar to beam combiner 604).

In various embodiments, the imprinting-shifting component 830 comprises as many phase shifters 820 as the number of channels at which the beamforming system is configured to operate. For example, in an example embodiment the beamforming system is configured to transmit and/or receive transmissions via M different channels (or frequency ranges or frequency bands) and the imprinting-shifting component 830 of a beamforming element 800 of the beamforming system comprises M phase shifters 820 such that the respective optical phases of (respective portions of) an imprinted beam can be independently adjusted, modified, and/or shifted such that the beamforming of different channels, frequency ranges, and/or frequency bands can be individually and/or independently controlled.

In various embodiments, the modulator 810 comprises an optical input configured to receive the second beam (e.g., via the second beam waveguide and/or optical fiber 828) and an electrical input 815 configured to receive a respective electrical input signal. Plot 872 illustrates an example frequency profile of the electrical input signal that is applied to the electrical input 815 of the modulator 810, where the horizontal axis is a frequency axis and the vertical axis indicates power or amplitude of the electrical input signal. The electrical input signal comprises frequency components corresponding to various channels, frequency ranges, and/or frequency bands at which the beamforming system is configured to operate, with the time-dependent amplitude of each respective frequency component controlled and/or dependent on a corresponding respective transmission in the respective channel, frequency range, and/or frequency band that was incident on the respective antenna.

In the example illustrated embodiment, the first channel (and/or frequency range) corresponds to a first received (radio) frequency of $f_{RF1}$, the second channel (and/or frequency range) corresponds to a second received (radio) frequency of $f_{RF2}$, and the third channel (and/or frequency range) corresponds to a third received (radio) frequency of $f_{RF3}$. In other words, the first channel (and/or frequency range) corresponds to a first frequency band with a nominal frequency of the first received (radio) frequency of $f_{RF1}$, the second channel (and/or frequency range) corresponds to a second frequency band with a nominal frequency of the second received (radio) frequency of $f_{RF2}$, and the third channel (and/or frequency range) corresponds to a third frequency band with a nominal frequency of the third received (radio) frequency of $f_{RF3}$. Plot 872 illustrates an example frequency profile of the electrical input signal that is applied to the electrical input 815 of the modulator 810. As can be seen in plot 872, the frequency profile of the input signal (e.g., generated responsive to a transmission being incident on the respective antenna) comprises frequency components corresponding to the first channel, frequency range, and/or frequency band corresponding to the first received (radio) frequency $f_{RF1}$, the second channel, frequency range, and/or frequency band corresponding to the second received (radio) frequency $f_{RF2}$, and the third channel, frequency range, and/or frequency band range corresponding to the third received (radio) frequency $f_{RF3}$.

The modulator 810 modulates the second beam based on the input signal to generate an imprinted beam. Plot 873 illustrates the frequency profile of the imprinted beam, with the horizontal axis being a frequency axis and the vertical axis indicating amplitude and/or power of the imprinted beam. As can be seen by plot 873, the imprinted beam includes a line or narrow spike at the second frequency $f_2$ and sidelobes on either side of the second frequency line or narrow spike that correspond to respective ones of the frequency components of the various channels, frequency ranges, and/or frequency bands present in the input signal. As can be seen in plot 873, in various embodiments, the respective frequency components for the various channels to do not overlap with one another at non-zero amplitude. In other words, the received frequencies of the first, second, and third channels $f_{RF1}$, $f_{RF2}$, $f_{RF3}$ are separated from one another by at least the frequency width of the channel. In various embodiments, the amplitudes of the frequency components of the input electrical signal are functions of time that are independent of one another (e.g., the amplitude of one channel does not affect the amplitude of another channel), such that information may be independently encoded in the time-dependent frequency component of each channel.

The modulator 810 is configured to couple the imprinted beam into a waveguide and/or optical fiber appropriate for the application and configured to provide the imprinted beam to a splitting optical filter element 802. In an example embodiment, the splitting optical fiber element 802 is an AWG (e.g., in a demultiplexer configuration). In various embodiments, the splitting optical filter element 802 is configured to split the imprinted beam into a plurality (e.g., M, corresponding to the number of channels, frequency ranges, and/or frequency bands at which the beamforming system operates) of channel imprinted beams. For example, each channel imprinted beam is configured and/or formed to include the side lobes of the frequency profile corresponding to a respective channel, frequency range, and/or frequency band and to not include the side lobes corresponding to any other channel, frequency range, and/or frequency band.

For example, as shown in plot 874A, the frequency profile of a first channel imprinted beam comprises the side lobes corresponding to the first channel, frequency range, and/or frequency band corresponding to the first received (radio) frequency $f_{RF1}$ and the line or narrow spike at the second frequency $f_2$. However, the frequency profile of the first channel imprinted beam does not comprise the side lobes corresponding to the second channel or the third channel that are present in the imprinted beam. Similarly, as shown in plot 874B, the frequency profile of a second channel imprinted beam comprises the side lobes corresponding to the second channel, frequency range, and/or frequency band corresponding to the second received (radio) frequency $f_{RF2}$ and the line or narrow spike at the second frequency $f_2$ and does not include the side lobes corresponding to the first channel or the third channel that are present in the imprinted beam. Similarly, as shown in plot 874C, the frequency profile of a third channel imprinted beam comprises the side lobes corresponding to the third channel, frequency range, and/or frequency band corresponding to the third received (radio) frequency $f_{RF3}$ and the line or narrow spike at the second frequency $f_2$ and does not include the side lobes corresponding to the first channel or the second channel that are present in the imprinted beam.

The splitting optical filter element 802 is configured to couple each of the respective channel imprinted beams into a respective waveguide and/or optical fiber. The respective waveguide and/or optical fiber is configured to provide the respective channel imprinted beam to the optical input of a respective one the phase shifters 820 (e.g., 820A, 820B, 820C). For example, a first channel imprinted beam (e.g., encoding information communicated via a transmission of the first channel, frequency range, and/or frequency band imprinted on an optical carrier comprising the second beam) is provided to a first phase shifter 820A and a second channel imprinted beam is provided to a second phase shifter 820B.

The respective phase shifters 820 each receive the respective channel imprinted beam and adjust, shift, modify, and/or the like the optical phase of the respective channel imprinted beam to form a respective channel phase-shifted imprinted beam. For example, the respective phase shifter 820 may impart a respective optical phase shift to the respective channel imprinted beam to form a respective channel phase-shifted imprinted beam. For example, the first phase shifter 820A receives the first channel imprinted beam and imparts a first optical phase shift to the first channel imprinted beam to form a first channel phase-shifted imprinted beam. Similarly, the second phase shifter 820B receives the second channel imprinted beam and imparts a second optical phase shift to the second channel imprinted beam to form a second phase-shifted imprinted beam.

In various embodiments, the size, amplitude, and/or amount of a respective phase shift imparted to a respective optical phase of a respective channel imprinted beam is controlled via the application of a respective controlling signal to the respective phase shifter 820 that was generated by and/or caused to be generated by the controller 110. In various embodiments, the respective phase shifts imparted to the respective channel imprinted beams by the respective phase shifters 820 are independently controlled. For example, the first phase shifter 820A is controlled (e.g., by the controller 110) to impart a first optical phase shift $\varphi_1$ to the first channel imprinted beam and the second phase shifter 620B is controlled (e.g. by the controller 110) to impart a second optical phase shift $\varphi_2$ to the second channel imprinted beam, with the first optical phase shift $\varphi_1$ and the second optical phase shift $\varphi_2$ being independently controlled. In various embodiments, the phase shift imparted to a respective channel imprinted beam is determined (e.g., by the controller 110) based on the expected direction of a device that generated the corresponding received transmission with respect to the antenna array of the beamforming system 105. For example, a first device may be communicating with the controller 110 of the beamforming system 105 using the first channel and a second device may be communicating with the controller 110 using the second channel. The first device is located in a first direction from the antenna array and the second device is located in a second direction from the antenna array. Therefore, the beamforming system 105 (e.g., the controller 110) may process the received transmissions to account for the respective directions with respect to the antenna array from which the transmissions originated. For example, the beamforming system 105 may "listen" in a direction toward the first device for transmissions of the first channel and may "listen" in a direction toward the second device for transmissions of the second channel. Additional devices may be similarly accommodated, with the beamforming system 105 preferentially "listening" in respective directions for transmissions of respective channels by applying independent optical phase shifts to the respective channel imprinted beams by the respective beamforming elements 800.

In various embodiments, the respective phase shifters 820 are configured to generally not affect the respective frequency profile of the respective channel imprinted beam. Thus, the frequency profile of the respective channel phase-shifted imprinted beam is substantially the same as that of the respective channel imprinted beam. For example, the frequency profile of the first channel phase-shifted imprinted beam is substantially the same as that of the first channel imprinted beam (e.g., as illustrated in plot 874A).

Each of the respective phase shifters 820 couples the respective channel phase-shifted imprinted beam into a respective waveguide and/or optical fiber configured to provide the respective channel phase-shifted imprinted beam to the combining optical filtering element 804. In various embodiments, the combining optical filtering element 804 receives the M respective channel phase-shifted imprinted beams and combines them into a phase-shifted imprinted beam. In an example embodiment, the combining optical filtering element 804 is a beam combiner (e.g., similar to beam combiner 604) or an AWG (in a multiplexing configuration). In various embodiments, the combined effect of the splitting optical filter element 802, respective phase shifters 820, and the combining optical filtering element 804 should generally not affect the frequency profile of the phase-shifted imprinted beam, the phase-shifted imprinted beam has a frequency profile similar to and/or generally/substantially the same as the frequency profile of the imprinted beam and as shown in plot 873.

The combining optical filter element 804 couples the phase-shifted imprinted beam into a waveguide and/or optical fiber configured to provide the phase-shifted imprinted beam to the multi-beam optical coupler 840.

The multi-beam optical coupler 840 is configured to receive the phase-shifted imprinted beam and the first beam and to cause the phase-shifted imprinted beam and the first beam to interact and/or interfere with one another to form an interference beam. For example, the multi-beam optical coupler 840 may be similar to the multi-beam optical coupler 140.

Plot 878 illustrates the frequency profile of the interference beam, where the horizontal axis is the frequency axis and the vertical axis represents amplitude or power of the interference beam. As can be seen in plot 878, the frequency profile of the interference beam includes a line or narrow spike at the first frequency $f_1$ and lines or narrow spikes located at the particular frequency difference $\Delta f(f_1-f_2=\Delta f)$ above and below the first frequency $f_1$. The interference beam further includes the respective time-dependent frequency components (each corresponding to a respective channel, frequency range, and/or frequency band) of the electrical input signal that were imprinted onto the second beam spaced apart from the line or narrow spike located at the particular frequency difference $\Delta f$ below the first frequency $f_1$ by the respective received (radio) frequencies. For example, the frequency profile of the interference beam includes a side lobe located at $f_{RF1}$ from the line or narrow spike located at the particular frequency difference $\Delta f$ below the first frequency and that encodes the time-dependent frequency components of the electrical input signal corresponding to the first channel, frequency range, and/or frequency band. Similarly, the frequency profile of the interference beam includes a side lobe located at $f_{RF2}$ from the line or narrow spike located at the particular frequency difference $\Delta f$ below the first frequency and that encodes the time-dependent frequency components of the electrical input signal corresponding to the second channel, frequency range, and/or frequency band and a side lobe located at $f_{RF3}$ from the line or narrow spike located at the particular frequency difference $\Delta f$ below the first frequency and that encodes the time-dependent frequency component of the electrical input signal corresponding to the third channel, frequency range, and/or frequency band. Thus, the interference beam encodes the time-dependent frequency components of the electrical input signal with the frequency components corresponding to each respective channel, frequency range, and/or frequency band individually configured for a particular beamforming direction.

The interference beam is then provided (e.g., via an appropriate waveguide and/or optical fiber) to the optical-to-electrical converter component 850. For example, the optical-to-electrical converter component 850 comprises one or more photodetectors, in various embodiments. For example, in various embodiments, the optical-to-electrical converter component 850 is similar to the optical-to-electrical converter component 450. For example, the interference beam (and/or a respective portion thereof) is incident on each respective photodetector of the optical-to-electrical converter component 850 and an induced electrical signal is generated responsive thereto. The induced electrical signal may be filtered and/or amplified before the resulting output electrical signal is provided (via electrical output 860) to controller 110 and/or the like.

Plot 880 illustrates the frequency profile (in the electrical domain) of the induced electrical signal generated by the interference beam being incident on the photodetectors of the optical-to-electrical converter component 850. The frequency profile includes a line or narrow spike at the beat frequency of the interference pattern caused by interfering the first beam and the second beam (which is equivalent to the particular frequency difference $\Delta f$), as the second beam is the optical carrier of the phase-shifted imprinted beam. The frequency profile further includes respective representations of the frequency components of the electrical input signal corresponding to the respective channels, frequency ranges, and/or frequency bands spaced apart from the beat frequency by the respective received frequencies. As shown in plot 880, a low pass filter 858 (e.g., an electronic microwave low pass filter) may be used to filter the electrical signal such that only the lower frequency representation of the respective frequency components of the electrical input signal are passed to the electrical output 860 as the output electrical signal. Thus, the electrical signal includes the time-dependent information encoded at respective channels, frequency ranges, and/or frequency bands in the input signal provided to the electrical input 815 of the modulator 810 at a down-converted frequency.

For example the time-dependent information corresponding to the first channel, frequency range, and/or frequency band and encoded in the electrical input signal provided to the electrical input 815 of the modulator 810 is present in the (output) electrical signal at frequency range corresponding to the nominal frequency and/or centered at $f_{RF1}-\Delta f$ and the time-dependent information corresponding to the second channel, frequency range, and/or frequency band and encoded in the input signal provided to the modulator 810 is present in the (output) electrical signal at frequency range corresponding to the nominal frequency and/or centered at $f_{RF2}-\Delta f$. Moreover, each frequency component of the output electrical signal has been (independently) time delayed, with respect to the respective frequency components of respective electrical signals generated by other beamforming elements 800 of the beamforming system, such that when the controller 110 processes and/or analyzes the electrical signal, the controller 110 can "listen" in the direction from which each respective transmission corresponding to a respective one of the channels, frequency ranges, and/or frequency bands originated.

FIG. 9 illustrates another example embodiment of a beamforming element 900 configured for use in an upstream configuration of a beamforming system that operates at a plurality of channels, frequency ranges, and/or frequency bands. While FIG. 9 illustrates an embodiment configured for use with four channels or frequency ranges, various embodiments may be configured for use with various numbers of channels, frequency ranges, and/or frequency bands, as appropriate for the application. For example, the beamforming element 900 may be used as the beamforming element 108 in an example embodiment of the upstream configuration of the beamforming system 105.

In the illustrated embodiment, the beamforming element 900 comprises a first beam waveguide and/or optical fiber 928. The first beam waveguide and/or optical fiber 928 is configured to have coupled thereinto a first beam characterized by a first wavelength and/or first frequency. For example, the multi-wavelength optical source may couple the first beam into first beam waveguide and/or optical fiber 928. In general, the frequency profile of the first beam includes a line or narrow spike at the first frequency. The first beam waveguide and/or optical fiber 928 provides the first beam to the multi-beam optical coupler 940.

In the illustrated embodiment, the beamforming element 900 comprises a second beam waveguide and/or optical fiber 926. The second beam waveguide and/or optical fiber 926 is configured to have coupled thereinto a second beam characterized by a second wavelength and/or a second frequency. For example, the multi-wavelength optical source may couple the second beam into the second beam waveguide and/or optical fiber 926. The frequency profile of second beam generally includes a line and/or narrow spike at the second frequency. In an example embodiment, the second frequency is less than the first frequency (e.g., $f_2<f_1$). The second beam waveguide and/or optical fiber 928 provides the second beam to the optical input of the imprinting-shifting component 930.

In the illustrated embodiment, the beamforming element 900 comprises imprinting-shifting component 930. The imprinting-shifting component 930 comprises a modulator 910, one or more beam splitters 906, two or more splitting optical filtering elements 902 (e.g., 902A, 902B), a plurality of phase shifters 920 (e.g., 920A, 920B, 920C, 920D), two or more combining optical filtering elements 904 (e.g., 904A, 904B), and one or more beam combiners 908. In various embodiments, the modulator 910 is similar to the modulator 310 and each of the phase shifters 920A, 920B, 920C, 920D is similar to the phase shifter 320. In various embodiments, the splitting optical filtering elements 902 and/or the combining optical filtering elements 904 are respective AWGs. In an example embodiment, the combining optical filtering element 904 is a beam combiner (e.g., similar to beam combiner 908).

In various embodiments, the imprinting-shifting component 930 comprises as many phase shifters 920 as the number of channels at which the beamforming system is configured to operate. For example, in an example embodiment the beamforming system is configured to transmit and/or receive transmissions via M different channels (or frequency ranges or frequency bands) and the imprinting-shifting component 930 of a beamforming element 900 of the beamforming system comprises M phase shifters 920 such that the respective optical phases of (respective portions of) an imprinted beam can be independently adjusted, modified, and/or shifted such that the beamforming of different channels, frequency ranges, and/or frequency bands can be individually and/or independently controlled.

In various embodiments, the modulator 910 comprises an optical input configured to receive the second beam (e.g., via the second beam waveguide and/or optical fiber 928) and an electrical input 915 configured to receive a respective electrical input signal. Plot 972 illustrates an example frequency profile of the electrical input signal that is applied to the electrical input 915 of the modulator 910, where the horizontal axis is a frequency axis and the vertical axis indicates the power or amplitude of the electrical input signal. The electrical input signal comprises frequency components corresponding to various channels, frequency ranges, and/or frequency bands at which the beamforming system is configured to operate, with the time-dependent amplitude of each respective frequency component controlled and/or dependent on a corresponding respective transmission in the respective channel, frequency range, and/or frequency band that was incident on the respective antenna.

In the example illustrated embodiment, the first channel (and/or frequency range and/or frequency band) corresponds to a first received (radio) frequency of $f_{RF1}$, the second channel (and/or frequency range and/or frequency band) corresponds to a second received (radio) frequency of $f_{RF2}$, the third channel (and/or frequency range and/or frequency band) corresponds to a third received (radio) frequency of $f_{RF3}$, and the fourth channel (and/or frequency range and/or frequency band) corresponds to a third received (radio) frequency of $f_{RF4}$. In other words, the first channel (and/or frequency range and/or frequency band) corresponds to a first frequency band with a nominal frequency of the first received (radio) frequency of $f_{RF1}$, the second channel (and/or frequency range and/or frequency band) corresponds to a second frequency band with a nominal frequency of the second received (radio) frequency of $f_{RF2}$, the third channel (and/or frequency range and/or frequency band) corresponds to a third frequency band with a nominal frequency of the third received (radio) frequency of $f_{RF3}$, and the fourth channel (and/or frequency range and/or frequency band) corresponds to a fourth frequency band with a nominal frequency of the fourth received (radio) frequency of $f_{RF4}$. Plot 972 illustrates an example frequency profile of the electrical input signal that is applied to the electrical input 915 of the modulator 910. As can be seen in plot 972, the frequency profile of the electrical input signal (e.g., generated responsive to a transmission being incident on the respective antenna) comprises frequency components corresponding to the first channel, frequency range, and/or frequency band corresponding to the first received (radio) frequency $f_{RF1}$, the second channel, frequency range, and/or frequency band corresponding to the second received (radio) frequency $f_{RF2}$, the third channel, frequency range, and/or frequency band corresponding to the third received (radio) frequency $f_{RF3}$, and the fourth channel, frequency range, and/or frequency band corresponding to the fourth received (radio) frequency $f_{RF4}$.

The modulator 910 modulates the second beam based on the electrical input signal to generate an imprinted beam. Plot 973 illustrates the frequency profile of the imprinted beam, with the horizontal axis being a frequency axis and the vertical axis indicating amplitude and/or power of the imprinted beam. As can be seen by plot 973, the imprinted beam includes a line or narrow spike at the second frequency $f_2$ and sidelobes on either side of the second frequency line or narrow spike that correspond to respective ones of the frequency components of the various channels and/or frequency ranges present in the electrical input signal. As can be seen in plot 973, in various embodiments, the respective frequency components for the various channels to do not overlap with one another at non-zero amplitude. In other words, the received frequencies of the first, second, third, and fourth channels $f_{RF1}$, $f_{RF2}$, $f_{RF3}$, $f_{RF4}$ are separated from one another by at least the frequency width of the channel. In various embodiments, the amplitudes of the frequency components of the input signal are functions of time that are independent of one another (e.g., the amplitude of one channel does not affect the amplitude of another channel), such that information may be independently encoded in the time-dependent frequency component of each channel.

The modulator 910 is configured to couple the imprinted beam into a waveguide and/or optical fiber appropriate for the application and configured to provide the imprinted beam to a beam splitter 906. In various embodiments, the beam splitter 906 is configured to split the imprinted beam into two or more portions of the imprinted beam, with each portion of the imprinted beam substantially the same as the other portion(s) of the imprinted beam. Each portion of the imprinted beam is coupled into a respective waveguide and/or optical fiber configured to provide each portion of the imprinted beam to a respective one of the splitting optical filtering elements 902.

In various embodiments, a respective splitting optical filter element 902 is configured to receive a respective portion of the imprinted beam and to provide selected respective channel imprinted beams to respective phase shifters 920 (e.g., via an appropriate waveguide and/or optical fiber). In an example embodiment, the splitting optical fiber elements 902 are each an AWG (e.g., in a demultiplexer configuration) configured to pass selected channels, frequency ranges, and/or frequency bands. In various embodiments, a respective splitting optical filter element 902 is configured to split the imprinted beam into a plurality (e.g., M, corresponding to the number of channels and/or wavelength ranges at which the beamforming system operates) of channel imprinted beams and provide only selected ones of the channel imprinted beams. For example, each channel imprinted beam is configured and/or formed to include the side lobes of the frequency profile corresponding to a respective channel, frequency range, and/or frequency band and to not include the side lobes corresponding to any other channel and/or frequency range. In an example embodiment, each splitting optical filter element 902 is configured to provided selected channel imprinted beams for a set of non-adjacent and/or non-neighboring channels, frequency ranges, and/or frequency bands.

For example, as shown in plot 974A, the frequency profile of a first channel imprinted beam comprises the side lobes corresponding to the first channel and/or frequency range corresponding to the first received (radio) frequency $f_{RF1}$ and the line or narrow spike at the second frequency $f_2$.

However, the frequency profile of the first channel imprinted beam does not comprise the side lobes corresponding to the second channel, third channel, or fourth channel that are present in the imprinted beam. Similarly, the frequency profile of a second channel imprinted beam comprises the side lobes corresponding to the second channel and/or frequency range corresponding to the second received (radio) frequency $f_{RF2}$ and the line or narrow spike at the second frequency $f_2$ and does not include the side lobes corresponding to the first channel, third channel, or fourth channel that are present in the imprinted beam.

In various embodiments, the respective splitting optical filter elements 902 are each configured to provide only selected respective channel imprinted beams. For example, a splitting optical filter element 902 is configured to provide a set of non-adjacent and/or non-neighboring respective channel imprinted beams. For example, as shown plot 972, the first channel, frequency range, and/or frequency band is adjacent and/or neighboring (in the frequency domain) to the second channel, frequency range, and/or frequency band, the second channel, frequency range, and/or frequency band is adjacent and/or neighboring (in the frequency domain) to the first channel, frequency range, and/or frequency band and the third channel, frequency range, and/or frequency band, the third channel, frequency range, and/or frequency band is adjacent and/or neighboring (in the frequency domain) to the channel, frequency range, and/or frequency band and the fourth channel, frequency range, and/or frequency band, and the fourth channel and/or frequency range is adjacent and/or neighboring (in the frequency domain) to the channel, frequency range, and/or frequency band. Thus, a first splitting optical filter element 902A passes the first channel imprinted beam and the third channel imprinted beam, as the first and third channels are not adjacent to one another, and does not pass the second and fourth channel imprinted beams. Similarly, the second splitting optical filter element 902B passes the second channel imprinted beam and the fourth channel imprinted beam, but does not pass the first and third channel imprinted beams.

By using splitting optical filter elements 902 to separate non-adjacent and/or non-neighboring channels, the channels may be more densely defined (in the frequency domain). For example, by using splitting optical filter elements 902 to separate non-adjacent and/or non-neighboring channels, the beamforming element 900 enables the accurate processing of transmissions of channels that are defined to include less empty space (in the frequency domain) between the channels. For example, the effective optical filter of the splitting optical filter element 902 does not include infinitely steep vertical components, thus the accuracy with which splitting optical filter 902 can filter different frequency ranges into separate beams is finite and/or imperfect. To reduce crosstalk between adjacent and/or neighboring channels at the processing stage, the channels may be defined so as to allow empty space (in the frequency domain) between adjacent and/or neighboring channels. However, by using a splitting optical filter element 902 that selects non-adjacent and/or non-neighboring channels, the crosstalk between adjacent and/or neighboring channels is reduced. Thus, various embodiments enable a denser (in the frequency domain) definition of the channels at which the beamforming system operates.

The respective splitting optical filter elements 902 are configured to couple each of the respective selected channel imprinted beams into a respective waveguide and/or optical fiber. The respective waveguide and/or optical fiber is configured to provide the respective selected channel imprinted beam to the optical input of a respective one the phase shifters 920 (e.g., 920A, 920B, 920C, 920D). For example, a first channel imprinted beam (e.g., encoding information communicated via a transmission of the first channel, frequency range, and/or frequency band imprinted on an optical carrier comprising the second beam) is generated by a first splitting optical filter element 902A and provided to a first phase shifter 920A, a second channel imprinted beam is generated by a second splitting optical filter element 902B and provided to a second phase shifter 920B, a third channel imprinted beam is generated by the first splitting optical filter element 902A and provided to a third phase shifter 902C, and a fourth channel imprinted beam is generated by the second splitting optical filter element 902B and provided to a fourth phase shifter 920D.

The respective phase shifters 920 each receive the respective channel imprinted beam and adjust, shift, modify, and/or the like the optical phase of the respective channel imprinted beam to form a respective channel phase-shifted imprinted beam. For example, the respective phase shifter 920 may impart a respective optical phase shift to the respective channel imprinted beam to form a respective channel phase-shifted imprinted beam. For example, the first phase shifter 920A receives the first channel imprinted beam and imparts a first optical phase shift to the first channel imprinted beam to form a first channel phase-shifted imprinted beam. Similarly, the second phase shifter 920B receives the second channel imprinted beam and imparts a second optical phase shift to the second channel imprinted beam to form a second phase-shifted imprinted beam.

In various embodiments, the size, amplitude, and/or amount of a respective phase shift imparted to a respective optical phase of a respective channel imprinted beam is controlled via the application of a respective controlling signal to the respective phase shifter 920 that was generated by and/or caused to be generated by the controller 110. In various embodiments, the respective phase shifts imparted to the respective channel imprinted beams by the respective phase shifters 920 are independently controlled. For example, the first phase shifter 920A is controlled (e.g., by the controller 110) to impart a first optical phase shift $\varphi_1$ to the first channel imprinted beam and the second phase shifter 920B is controlled (e.g., by the controller 110) to impart a second optical phase shift $\varphi_2$ to the second channel imprinted beam, with the first optical phase shift $\varphi_1$ and the second optical phase shift $\varphi_2$ being independently controlled.

In various embodiments, the phase shift imparted to a respective channel imprinted beam is determined (e.g., by the controller 110) based on the expected direction of a device that generated the corresponding received transmission with respect to the antenna array of the beamforming system 100. For example, a first device may be communicating with the controller 110 of the beamforming system 105 using the first channel and a second device may be communicating with the controller 110 using the second channel. The first device is located in a first direction from the antenna array and the second device is located in a second direction from the antenna array. Therefore, the beamforming system 100 may process the received transmissions to account for the direction with respect to the antenna array from which the transmission originated. For example, the beamforming system 105 may "listen" in a direction toward the first device for transmissions of the first channel and may "listen" in a direction toward the second device for transmissions of the second channel. Additional devices may be similarly accommodated, with the beamforming system 105 preferentially "listening" in respective directions for transmissions of respective channels by applying independent optical phase shifts to the respective channel imprinted beams by the respective beamforming elements 900.

In various embodiments, the respective phase shifters 920 are configured to generally not affect the respective frequency profile of the respective channel imprinted beam. Thus, the frequency profile of the respective channel phase-shifted imprinted beam is substantially the same as that of the respective channel imprinted beam. For example, the frequency profile of the first channel phase-shifted imprinted beam is substantially the same as that of the first channel imprinted beam (e.g., as illustrated in plot 974A).

Each of the respective phase shifters 920 couples the respective channel phase-shifted imprinted beam into a respective waveguide and/or optical filter configured to provide the respective channel phase-shifted imprinted beam to a respective one of the combining optical filtering elements 904. In various embodiments, the respective combining optical filtering elements 904 receives the respective channel phase-shifted imprinted beams and combines them into a respective partial phase-shifted imprinted beam. In an example embodiment, the respective combining optical filter elements 904 are beam combiners (e.g., similar to beam combiner 604) or AWGs (in a multiplexing configuration). Each of the combining optical filter elements 904 are configured to generate a respective partial phase-shifted imprinted beam and provide the respective partial phase-shifted imprinted beam to the beam combiner 908.

Embodiments where the combining optical filter elements 904 are AWGs provide the advantage of frequency filtering the respective phase-shifted imprinted beams so as to reduce noise in the resulting partial phase-shifted imprinted beam. For example, the combining optical filter element 904A is configured to only combine frequency components of the first and third phase-shifted imprinted beams corresponding to the first and third channels and the second frequency since the corresponding splitting filter element 902A only passes frequency components of the first and third phase-shifted imprinted beams corresponding to the first and third channels and the second frequency. Thus, the respective channel phase-shifted imprinted beams provided to the combining filter element 904A should not include frequency components corresponding to the second or fourth channels. Thus, the combining optical filter component 904A should not combine frequency components corresponding to the second or fourth channels with the expected frequency components corresponding to the first and third channels (and the second beam). Similarly, the combining optical filter element 904B may only combine frequency components corresponding to second and fourth channels (and the second frequency) as the corresponding splitting optical filter element 902B only provides a second channel imprinted beam and a fourth channel imprinted beam.

The beam combiner 908 is configured to receive the partial phase-shifted imprinted beams and combine the partial phase-shifted imprinted beams to form a phase-shifted imprinted beam. For example, the partial phase-shifted imprinted beams each comprise frequency components for only a (non-adjacent and/or non-neighboring) subset of the M channels (e.g., M/2 or fewer channels). The partial phase-shifted imprinted beams are combined to form a phase-shifted imprinted beam that includes frequency components for each of the M channels.

In various embodiments, the combined effect of the beam splitter 906, splitting optical filter elements 902, respective phase shifters 920, the combining optical filtering elements 904, and beam combiner 908 should generally not affect the frequency profile of the phase-shifted imprinted beam. Thus, the phase-shifted imprinted beam has a frequency profile similar to and/or generally/substantially the same as the frequency profile of the imprinted beam and as shown in plot 973.

The beam combiner 908 couples the phase-shifted imprinted beam into a waveguide and/or optical fiber configured to provide the phase-shifted imprinted beam to the multi-beam optical coupler 840.

The multi-beam optical coupler 940 is configured to receive the phase-shifted imprinted beam and the first beam and to cause the phase-shifted imprinted beam and the first beam to interact and/or interfere with one another to form an interference beam. For example, the multi-beam optical coupler 940 may be similar to the multi-beam optical coupler 140.

Plot 978 illustrates the frequency profile of the interference beam, where the horizontal axis is the frequency axis and the vertical axis represents amplitude or power of the interference beam. As can be seen in plot 978, the frequency profile of the interference beam includes a line or narrow spike at the first frequency $f_1$ and lines or narrow spikes located at the particular frequency difference $\Delta f(f_1-f_2=\Delta f)$ above and below the first frequency $f_1$. The interference beam further includes the respective time-dependent frequency components (each corresponding to a respective channel and/or frequency range) of the input signal that were imprinted onto the second beam spaced apart from the line or narrow spike located at the particular frequency difference $\Delta f$ below the first frequency $f_1$ by the respective frequency differences of the respective received (radio) frequencies. For example, the frequency profile of the interference beam includes a side lobe located at $f_{RF1}$ from the line or narrow spike located at the particular frequency difference $\Delta f$ below the first frequency that encode the time-dependent frequency components of the electrical input signal corresponding to the first channel, frequency range, and/or frequency band. Similarly, the frequency profile of the interference beam includes a side lobe located at $f_{RF2}$ from the line or narrow spike located at the particular frequency difference $\Delta f$ below the first frequency that encodes the time-dependent frequency components of the electrical input signal corresponding to the second channel, frequency range, and/or frequency band and a side lobe located at $f_{RF3}$ from the line or narrow spike located at the particular frequency difference $\Delta f$ below the first frequency that encodes the time-dependent frequency component of the electrical input signal corresponding to the third channel, frequency range, and/or frequency band. Side lobes representing a frequency component of the electrical input signal corresponding to the fourth channel are also present in the frequency profile of the interference beam spaced apart the line or narrow spike located at the particular frequency difference $\Delta f$ from the first frequency by the fourth received frequency $f_{RF4}$. Thus, the interference beam encodes the time-dependent frequency components of the electrical input signal with the frequency components corresponding to each respective channel, frequency range, and/or frequency band individually configured for a particular beamforming direction.

The interference beam is then provided (e.g., via an appropriate waveguide and/or optical fiber) to the optical-to-electrical converter component 950. For example, the optical-to-electrical converter component 950 comprises one or more photodetectors, in various embodiments. For example, in various embodiments, the optical-to-electrical converter component 950 is similar to the optical-to-electrical converter component 450. For example, the interference beam (and/or a respective portion thereof) is incident on each respective photodetector of the optical-to-electrical converter component 950 and an induced electrical signal is generated responsive thereto. The induced electrical signal may be filtered and/or amplified before the resulting electrical signal is provided (via electrical output 960) to the controller 110 and/or the like.

Plot 980 illustrates the frequency profile (in the electrical domain) of the induced electrical signal generated by the interference beam being incident on the photodetectors of the optical-to-electrical converter component 950. The frequency profile includes a line or narrow spike at the beat frequency of the interference pattern caused by interfering the first beam and the second beam (which is equivalent to the particular frequency difference $\Delta f$), as the second beam is optical carrier of the phase-shifted imprinted beam. The frequency profile further includes respective representations of the frequency components of the electrical input signal corresponding to the respective channels, frequency ranges, and/or frequency bands spaced apart from the beat frequency by the respective received frequencies. As shown in plot 980, a low pass filter 958 (e.g., an electronic microwave low pass filter) may be used to filter the electrical signal such that only the lower frequency representation of the respective frequency components of the input signal are passed to the electrical output 960 as the output electrical signal. Thus, the output electrical signal includes the time-dependent information encoded at respective channels, frequency ranges, and/or frequency bands in the electrical input signal provided to the electrical input 915 of the modulator 910 at a down-converted frequency.

For example the time-dependent information corresponding to the first channel, frequency range, and/or frequency band and encoded in the electrical input signal provided to the electrical input 915 of the modulator 910 is present in the (output) electrical signal at a frequency range with the nominal frequency and/or centered at $f_{RF1}-\Delta f$ and the time-dependent information corresponding to the second channel, frequency range, and/or frequency band and encoded in the electrical input signal provided to the modulator 910 is present in the (output) electrical signal at a frequency range with the nominal frequency and/or centered at $f_{RF2}-\Delta f$. Moreover, each frequency component of the output electrical signal has been (independently) time delayed, with respect to the respective frequency components of respective electrical signals generated by other beamforming elements 900 of the beamforming system, such that when the controller 110 processes and/or analyzes the electrical signal, the controller 110 can "listen" in the direction from which each respective transmission corresponding to a respective one of the channels or frequency ranges originated.

FIG. 10 illustrates an example embodiment of a beamforming element 1000 configured for use in an upstream configuration of a beamforming system that operates at a plurality of channels, frequency ranges, and/or frequency bands. While FIG. 10 illustrates an embodiment configured for use with four channels, frequency ranges, and/or frequency bands, various embodiments may be configured for use with various numbers of channels, frequency ranges, and/or frequency bands, as appropriate for the application. For example, the beamforming element 1000 may be used as the beamforming element 108 in an example embodiment of the upstream configuration of the beamforming system 105.

In the illustrated embodiment, the beamforming element 1000 comprises a first beam waveguide and/or optical fiber 1028. The first beam waveguide and/or optical fiber 1028 is configured to have coupled thereto a first beam characterized by a first wavelength and/or first frequency. For example, the multi-wavelength optical source may couple the first beam into first beam waveguide and/or optical fiber 1028. In general, the frequency profile of the first beam includes a line or narrow spike at the first frequency. In various embodiments, the first beam waveguide and/or optical filter 1028 comprises and/or is coupled to beam splitter 1004. The beam splitter 1004 is configured to split the first beam into a plurality of portions of the first beam. In an example embodiment, the beam splitter 1004 is configured to split the first beam into M portions of the first beam, where M is the number of channels at which the beamforming system operates. In an example embodiment, the beam splitter 1004 is a plurality of beam splitters. The first beam waveguide and/or optical fiber 1028 provides a portion of the first beam to each of the plurality (e.g., M) multi-beam optical couplers 1040 (e.g., 1040A, 1040B, 1040C, 1040D). In an example embodiment, each portion of the first beam is substantially the same and/or has substantially the same frequency profile as the other portions of the first beam.

In the illustrated embodiment, the beamforming element 1000 comprises a second beam waveguide and/or optical fiber 1026. The second beam waveguide and/or optical fiber 1026 is configured to have coupled thereto a second beam characterized by a second wavelength and/or a second frequency. For example, the multi-wavelength optical source may couple the second beam into the second beam waveguide and/or optical fiber 1026. The frequency profile of second beam generally includes a line and/or narrow spike at the second frequency. In an example embodiment, the second frequency is less than the first frequency (e.g., $f_2<f_1$). The second beam waveguide and/or optical fiber 1028 provides the second beam to the optical input of the imprinting-shifting component 1030.

In the illustrated embodiment, the beamforming element 1000 comprises imprinting-shifting component 1030. The imprinting-shifting component 1030 comprises a modulator 1010, one or more beam splitters 1006 (e.g., 1006A, 1006B, 1006C), and a plurality of phase shifters 1020 (e.g., 1020A, 1020B, 1020C, 1020D). In various embodiments, the modulator 1010 is similar to the modulator 310 and each of the phase shifters 1020A, 1020B, 1020C, 1020D is similar to the phase shifter 320.

In various embodiments, the imprinting-shifting component 1030 comprises as many phase shifters 1020 as the number of channels at which the beamforming system is configured to operate. For example, in an example embodiment the beamforming system is configured to transmit and/or receive transmissions via M different channels (or frequency ranges) and the imprinting-shifting component 1030 of a beamforming element 1000 of the beamforming system comprise M phase shifters 1020 such that the respective optical phases of (respective portions of) an imprinted beam can be independently adjusted, modified, and/or shifted such that the beamforming of different channels and/or frequency ranges can be individually and/or independently controlled.

In various embodiments, the modulator 1010 comprises an optical input configured to receive the second beam (e.g., via the second beam waveguide and/or optical fiber 1028) and an electrical input 1015 configured to receive an electrical input signal. Plot 1072 illustrates an example frequency profile of the electrical input signal that is applied to the electrical input 1015 of the modulator 1010, where the horizontal axis is a frequency axis and the vertical axis indicates power or amplitude of the electrical input signal. The electrical input signal comprises frequency components corresponding to various channels, frequency ranges, and/or frequency bands at which the beamforming system is configured to operate, with the time-dependent amplitude of each respective frequency component controlled and/or dependent on a corresponding respective transmission in the respective channel, frequency range, and/or frequency band that was incident on the respective antenna.

In the example illustrated embodiment, the first channel (and/or frequency range and/or frequency band) corresponds to a first received (radio) frequency of $f_{RF1}$, the second channel (and/or frequency range and/or frequency band) corresponds to a second received (radio) frequency of $f_{RF2}$, the third channel (and/or frequency range and/or frequency band) corresponds to a third received (radio) frequency of $f_{RF3}$, and the fourth channel (and/or frequency range and/or frequency band) corresponds to a third received (radio) frequency of $f_{RF4}$. In other words, the first channel (and/or frequency range and/or frequency band) corresponds to a first frequency band with a nominal frequency of the first received (radio) frequency of $f_{RF1}$, the second channel (and/or frequency range and/or frequency band) corresponds to a second frequency band with a nominal frequency of the second received (radio) frequency of $f_{RF2}$, the third channel (and/or frequency range and/or frequency band) corresponds to a third frequency band with a nominal frequency of the third received (radio) frequency of $f_{RF3}$, and the fourth channel (and/or frequency range and/or frequency band) corresponds to a fourth frequency band with a nominal frequency of the fourth received (radio) frequency of $f_{RF4}$. Plot 1072 illustrates an example frequency profile of the electrical input signal that is applied to the electrical input 1015 of the modulator 1010. As can be seen in plot 1072, the frequency profile of the electrical input signal (e.g., generated responsive to transmissions at various channels being incident on the respective antenna) comprises frequency components corresponding to the first channel, frequency range, and/or frequency band corresponding to the first received (radio) frequency $f_{RF1}$, the second channel, frequency range, and/or frequency band corresponding to the second received (radio) frequency $f_{RF2}$, the third channel, frequency range, and/or frequency band corresponding to the third received (radio) frequency $f_{RF3}$, and the fourth channel, frequency range, and/or frequency band corresponding to the fourth received (radio) frequency $f_{RF4}$.

The modulator 1010 modulates the second beam based on the electrical input signal to generate an imprinted beam. Plot 1074 illustrates the frequency profile of the imprinted beam, with the horizontal axis being a frequency axis and the vertical axis indicating amplitude and/or power of the imprinted beam. As can be seen by plot 1074, the imprinted beam includes a line or narrow spike at the second frequency $f_2$ and sidelobes on either side of the second frequency line or narrow spike that correspond to respective ones of the frequency components of the various channels and/or frequency ranges present in the electrical input signal. As can be seen in plot 1074, in various embodiments, the respective frequency components for the various channels to do not overlap with one another at non-zero amplitude. In other words, the received frequencies of the first, second, third, and fourth channels $f_{RF1}$, $f_{RF2}$, $f_{RF3}$, $f_{RF4}$ are separated from one another by at least the frequency width of the channel. In various embodiments, the amplitudes of the frequency components of the input signal are functions of time that are independent of one another (e.g., the amplitude of one channel does not affect the amplitude of another channel), such that information may be independently encoded in the time-dependent frequency of each channel.

The modulator 1010 is configured to couple the imprinted beam into a waveguide and/or optical fiber appropriate for the application and configured to provide the imprinted beam to a beam splitter network 1008 comprising a primary beam splitter 1006A, first secondary beam splitter 1006B, and second secondary beam splitter 1006C. In various embodiments, the beam splitter network may include more or fewer beam splitters, more or fewer layers of beam splitters, and/or the like, as appropriate for the application and the number of outputs of the specific beam splitters used. In various embodiments, the beam splitter network 1008 is configured to use the beam splitters 1006 (e.g., 1006A, 1006B, 1006C) to split the imprinted beam into M portions of the imprinted beam. In an example embodiment, each of the M portions of the imprinted beam is substantially the same as the other portions of the imprinted beam. For example, the frequency profile of each portion of the imprinted beam may be substantially the same as that of the imprinted beam (e.g., as illustrated in plot 1074). Each portion of the imprinted beam is coupled into a respective waveguide and/or optical fiber (e.g., by one or more beam splitters 1006 of the beam splitter network 1008) configured to provide the portions of the imprinted beam to a respective one of the phase shifters 1020.

The respective phase shifters 1020 each receive a respective portion of the imprinted beam and adjust, shift, modify, and/or the like the optical phase of the respective portion of the imprinted beam by a respective channel-specific phase shift to form a respective channel phase-shifted imprinted beam. For example, the respective phase shifter 1020 may impart a respective channel-specific optical phase shift to the respective portion of the imprinted beam to form a respective channel phase-shifted imprinted beam. For example, the first phase shifter 1020A receives a first portion of the imprinted beam and imparts a first optical phase shift corresponding to the first channel to the first portion of the imprinted beam to form a first channel phase-shifted imprinted beam. Similarly, the second phase shifter 1020B receives a second portion of the imprinted beam and imparts a second optical phase shift corresponding to the second channel to the second portion of the imprinted beam to form a second phase-shifted imprinted beam.

In various embodiments, the size, amplitude, and/or amount of a respective phase shift imparted to a respective optical phase of a respective portion of an imprinted beam is controlled via the application of a respective controlling signal to the respective phase shifter 1020 that was generated by and/or caused to be generated by the controller 110. In various embodiments, the respective channel-specific phase shifts imparted to the respective portions of the imprinted beam by the respective phase shifters 1020 are independently controlled. For example, the first phase shifter 1020A is controlled (e.g., by the controller 110) to impart a first optical phase shift $\varphi_1$ corresponding to the first channel to the first portion of the imprinted beam and the second phase shifter 1020B is controlled (e.g. by the controller 110) to impart a second optical phase shift $\varphi_2$ corresponding to the second channel to the second portion of the imprinted beam, with the first optical phase shift $\varphi_1$ and the second optical phase shift $\varphi_2$ being independently controlled.

In various embodiments, the phase shift imparted to a respective portion of the imprinted beam is determined (e.g., by the controller 110) based on the expected direction of a device that generated the corresponding received transmission (of the respective channel) with respect to the antenna array of the beamforming system 100. For example, a first device may be communicating with the controller 110 of the beamforming system 105 using the first channel and a second device may be communicating with the controller 110 using the second channel. The first device is located in a first direction from the antenna array and the second device is located in a second direction from the antenna array. Therefore, the beamforming system 100 may process the received transmissions to account for the direction with respect to the antenna array that the transmission originated. For example, the beamforming system 105 may "listen" in a direction toward the first device for transmissions of the first channel and may "listen" in a direction toward the second device for transmission of the second channel. Additional devices may be similarly accommodated, with the beamforming system 105 preferentially "listening" in respective directions for transmissions of respective channels by applying independent channel-specific optical phase shifts to the respective portions of the imprinted beams by the respective beamforming elements 1000.

In various embodiments, the respective phase shifters 1020 are configured to generally not affect the respective frequency profile of the respective portion of the imprinted beam. Thus, the frequency profile of the respective channel phase-shifted imprinted beam is substantially the same as that of the respective portion of the imprinted beam. For example, the frequency profile of the first channel phase-shifted imprinted beam is substantially the same as that of the first portion of the imprinted beam (e.g., as illustrated in plot 1074).

In various embodiments, the beamforming element comprises a plurality of multi-beam optical couplers 1040 (e.g., 1040A, 1040B, 1040C, 1040D). For example, in an example embodiment, the beamforming element 1000 is configured to process M channels and the beamforming element 1000 comprises M multi-beam optical couplers. Each of the respective phase shifters 1020 couples the respective channel phase-shifted imprinted beam into a respective waveguide and/or optical filter configured to provide the respective channel phase-shifted imprinted beam to a respective one of the multi-beam optical couplers 1040.

The respective multi-beam optical couplers 1040 are each configured to receive a respective channel phase-shifted imprinted beam and a respective portion of the first beam and to cause the respective channel phase-shifted imprinted beam and the respective portion of the first beam to interact and/or interfere with one another to form a respective channel interference beam. For example, the multi-beam optical couplers 1040 may be similar to the multi-beam optical coupler 140. In various embodiments, the respective channel interference beams each have the same frequency profile, but have different optical phases with respect to one another.

The respective channel interference beams are then each provided (e.g., via an appropriate waveguide and/or optical fiber) to a respective optical-to-electrical converter component 1050 (1050A, 1050B, 1050C, 1050D). In various embodiments, the beamforming element 1000 comprises a plurality of optical-to-electrical converter components 1050. For example, in an example embodiment, the beamforming element 1000 comprises M optical-to-electrical converter components 1050, where M is the number of channels at which the beamforming system comprising the beamforming element 1000 operates. For example, the respective optical-to-electrical converter components 1050 comprises one or more photodetectors, in various embodiments. For example, in various embodiments, the optical-to-electrical converter components 1050 are each similar to the optical-to-electrical converter component 450. For example, the respective channel interference beam (and/or a respective portion thereof) is incident on each respective photodetector of the respective optical-to-electrical converter component 1050 and an induced respective channel electrical signal is generated responsive thereto. The induced respective channel electrical signal may be filtered and/or amplified before the resulting channel electrical signal is provided (via a respective channel electrical output 1060 (e.g., 1060A, 1060B, 1060C, 1060D)) to the controller 110 and/or the like. In various embodiments, each respective channel electrical signal is filtered using a band pass filter that corresponds to the respective channel (e.g., passes frequencies within the frequency range of the respective channel and rejects frequencies outside of the frequency range of the respective channel) to from a respective channel output electrical signal.

Plot 1080A illustrates the frequency profile (in the electrical domain) of the induced first channel electrical signal generated by the first channel interference beam being incident on the photodetectors of the first optical-to-electrical converter component 1050A. The frequency profile includes a line or narrow spike at the beat frequency of the interference pattern caused by interfering the first beam and the second beam (which is equivalent to the particular frequency difference $\Delta f$), as the second beam is optical carrier of the phase-shifted imprinted beam. The frequency profile further includes respective representations of the frequency components of the electrical input signal corresponding to the respective channels, frequency ranges, and/or frequency bands spaced apart from the beat frequency by the respective received frequencies. As shown in plot 1080A, a channel-specific band pass filter 1058A (e.g., an electronic microwave band pass filter) may be used to filter the induced electrical signal such that only the frequency representation of the respective frequency component of the electrical input signal of the first channel is passed to the first channel electrical output 1060A as the first channel output electrical signal. Thus, the first channel output electrical signal includes the time-dependent information encoded at the first channel, frequency range, and/or frequency band in the electrical input signal provided to the electrical input 1015 of the modulator 1010 at a down-converted frequency (at a frequency of $f_{RF1} - \Delta f$).

Plot 1080B shows the frequency profile of the induced second channel electrical signal, plot 1080C shows the frequency profile of the induced third channel electrical signal, and plot 1080D shoes the frequency profile of the induced fourth channel electrical signal. The induced second channel electrical signal is filtered using a second channel band pass filter 1058B such that only the portion of the induced second channel electrical signal corresponding to the frequencies within the down-converted frequency range of the second channel are included in the second channel output electrical signal. Similarly, the induced third channel electrical signal is filtered using a third channel band pass filter 1058C such that only the portion of the induced third channel electrical signal corresponding to the frequencies within the down-converted frequency range of the third channel are included in the third channel output electrical signal, and the induced fourth channel electrical signal is filtered using a fourth channel band pass filter 1058D such that only the portion of the induced fourth channel electrical signal corresponding to the frequencies within the down-converted frequency range of the fourth channel are included in the fourth channel output electrical signal. The first channel output electrical signal is provided via the first channel electrical output 1060A, the second channel output electrical signal is provided via the second channel electrical output 1060B, the third output channel electrical signal is provided via the third channel electrical output 1060C, and the fourth channel output electrical signal is provided via the fourth channel electrical output 1060D, such that the controller 110 receives the respective channel output electrical signals, in various embodiments.

In various embodiments, the time-dependent information corresponding to the first channel and/or frequency range and encoded in the electrical input signal provided to the electrical input 1015 of the modulator 1010 is present in the first channel output electrical signal at a frequency range with the nominal frequency and/or centered at $f_{RF1}-\Delta f$ and the time-dependent information corresponding to the second channel and/or frequency range and encoded in the electrical input signal provided to the modulator 1010 is present in the second channel output electrical signal at a frequency range with the nominal frequency and/or centered at $f_{RF2}-\Delta f$. Moreover, each of the respective channel output electrical signals has been (independently) time delayed, with respect to the respective frequency components of respective electrical signals generated by other beamforming elements 1000 of the beamforming system, such that when the controller 110 processes and/or analyzes the electrical signal, the controller 110 can "listen" at each respective channel and/or frequency range in the direction from which the respective transmission corresponding to the respective channel or frequency range originated.

Embodiments where filtering occurs in the electrical domain rather than the optical domain provide an advantage in that the cut-off function of electrical filters tends to be steeper than the cut-off function of optical filters. Thus, by filtering only in the electrical domain, the channels may be more densely defined (in the frequency domain) while still reducing or minimizing crosstalk between channels, in various embodiments. As such, various embodiments enable a denser (in the frequency domain) definition of the channels at which the beamforming system operates.

Example Embodiments of Beamforming Networks

The proposed beamforming elements 102, 108, 500, 600, 700, 800, 900, 1000 can be deployed in parallel into different types of beamforming networks to feed an antenna array comprising N antennas (or antenna elements) operating with M wireless beams (e.g., channels, frequency ranges, frequency bands, and/or the like). Some non-limiting example types of beamforming network topologies that could be used include the Blass matrix and the Nolen matrix. In such deployment, N parallel beamforming elements 102, 108, 500, 600, 700, 800, 900, 1000 would be used, with each beamforming element supporting each of the M wireless beams (e.g., channels, frequency ranges, frequency bands, and/or the like).

Figure 11:
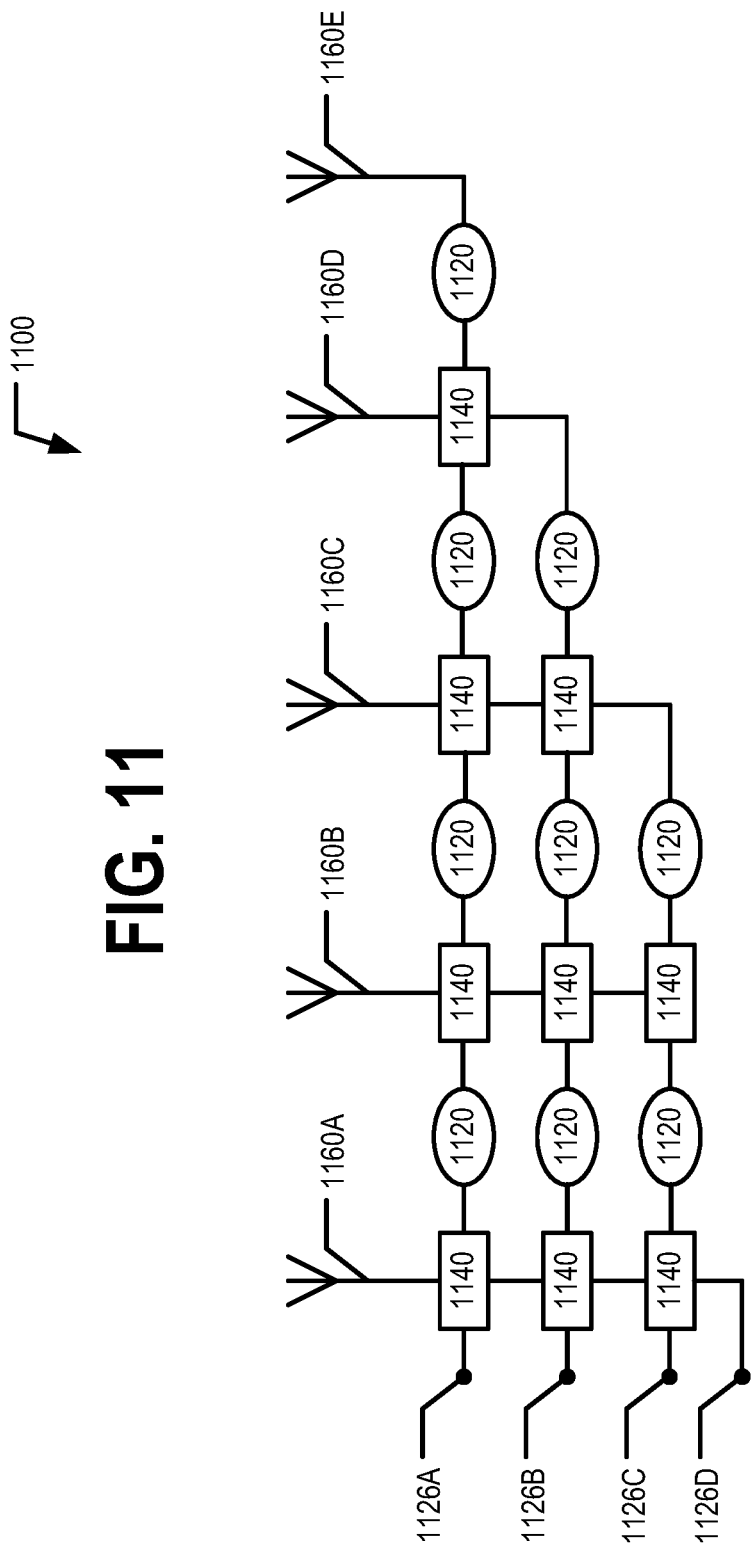
FIG. 11 is a block diagram illustrating a portion of a beamforming system, according to an example embodiment.

For example, FIG. 11 illustrates a beamforming network 1100 comprising beamforming elements using a Nolen matrix topology. The beamforming network 1100 comprises five antennas or antenna elements 1160A, 1160B, 1160C, 1160D, 1160E, a plurality of modulators 1140, and a plurality of phase shifters 1120. The beamforming network 1100 is configured to operate with four wireless beams (e.g., channels, frequency ranges, frequency bands, and/or the like) with each input 1126A, 1126B, 1126C, 1126D corresponding to one of the wireless beams (e.g., channels, frequency ranges, frequency bands, and/or the like). The inputs 1126A, 1126B, 1126C, 1126D are provided as electrical inputs to the respective electrical inputs of the modulators (e.g., via respective electrical inputs 315). For example, the modulators 1140 may each be similar to modulator 310 and/or the phase shifters 1120 may each be similar to phase shifter 320. Though not shown in FIG. 11, a multi-beam coupler 140 and optical-to-electrical converter components 450 may be used to generate the electrical signals provided to the antennas 1160 based on the phase-shifted imprinted beams generated by the respective modulators 1140 and phase shifters 1120. As should be understood, beamforming elements 102, 108, 500, 600, 700, 800, 900, 1000, and/or variations thereof, and/or combinations thereof may be used in various embodiments.

Figure 12:
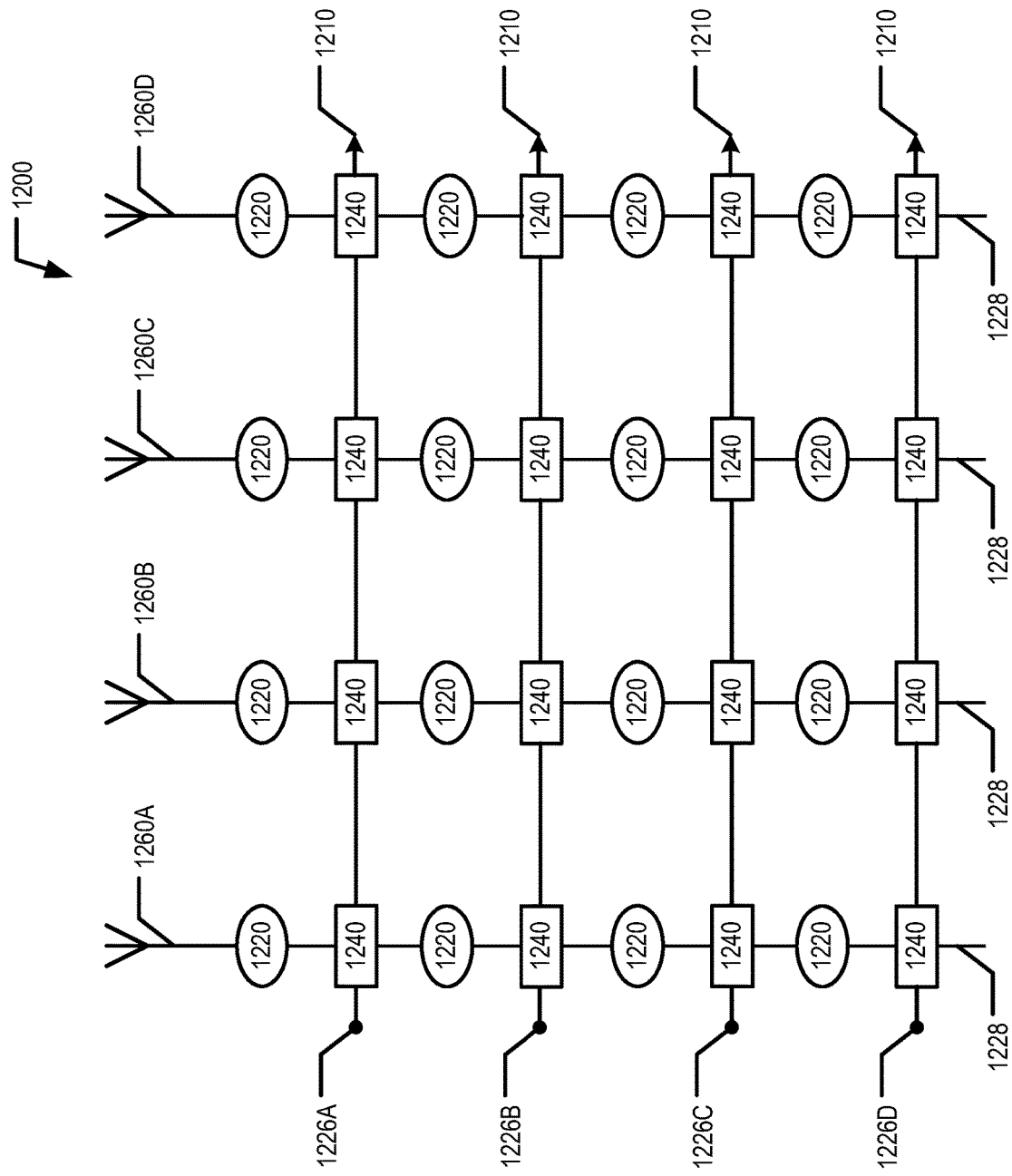
FIG. 12 is a block diagram illustrating a portion of a beamforming system, according to another example embodiment.

For example, FIG. 12 illustrates a beamforming network 1200 comprising beamforming elements using a Blass matrix topology. The beamforming network 1200 comprises four antennas or antenna elements 1260A, 1260B, 1260C, 1260D, a plurality of modulators 1240, and a plurality of phase shifters 1220. The beamforming network 1200 is configured to operate with four wireless beams (e.g., channels, frequency ranges, frequency bands, and/or the like) with each input 1226A, 1226B, 1226C, 1226D corresponding to one of the wireless beams (e.g., channels, frequency ranges, frequency bands, and/or the like). The input inputs 1226A, 1226B, 1226C, 1226D are provided as electrical inputs to the respective electrical inputs of the modulators (e.g., via respective electrical inputs 315). For example, the modulators 1240 may each be similar to modulator 310 and/or the phase shifters 1220 may each be similar to phase shifter 320. Though not shown in FIG. 12, a multi-beam coupler 140 and optical-to-electrical converter components 450 may be used to generate the electrical signals provided to the antennas 1260 based on the phase-shifted imprinted beams generated by the respective modulators 1240 and phase shifters 1220. As should be understood, beamforming elements 102, 108, 500, 600, 700, 800, 900, 1000, and/or variations thereof, and/or combinations thereof may be used in various embodiments. Inputs 1228 provide second beams onto which the electrical inputs provided via inputs 1226 may be imprinted (e.g., by modulators 1240) and/or first beams to be interfered with phase-shifted imprinted beams, for example, by respective multi-beam optical couplers. Outputs 1210 may be provided to additional antennas and/or antenna elements not shown or may result in lost power (e.g., coupled to ground)

In various embodiments, beamforming systems and/or beamforming elements are employed on a fronthaul link and/or a mobile fronthaul link (e.g., a fronthaul link for use in a mobile device network, radio access network (RAN), and/or the like). For example, the controller 110 (e.g., a BBU) may be used to control and/or operate a number of remote radio heads (RRHs) that are co-located with respective antennas and/or antenna arrays. In various embodiments, the mobile fronthaul link may operate using common public radio interface (CPRI) technology or analog radio-over-fiber (A-RoF) technology.

When beamforming systems and/or beamforming elements are employed in a mobile fronthaul link using CPRI, a digitized radio waveform (e.g., used to generate input signals applied to the respective electrical inputs of the respective modulators of the respective imprinting-shifting components of the respective beamforming elements) is transmitted from the controller 110 (e.g., a BBU) to the RRH associated with the beamforming system and/or beamforming element. The analog intermediate frequency (IF) waveform is constructed by the RRH using radio frequency (RF) digital-analog converters (DACs) such that the respective electrical signals are generated for application to the respective electrical inputs of the respective modulators. In various embodiments, the signal frequency(ies) of the electrical input signal(s) is a respective IF. All of the components of the optical beamforming network (e.g., antennas and/or antenna elements, beamforming elements, multi-wavelength optical source, and/or the like) are located on the RRH for both the downstream and the upstream directions/configurations of the link. As a result, the controller 110 is capable of handling baseband digital signals, whereas the RRH receives those baseband digital signals and transforms them to RF waveforms.

When beamforming systems and/or beamforming elements are employed in a mobile fronthaul link using A-ROF technology, the components of the beamforming system and/or beam forming elements may be physically separated and/or distant from one another in particular manners. In various embodiments, the multi-wavelength optical source, imprinting-shifting components (possibly imprinting-shifting components of a plurality of beamforming elements), and the multi-beam optical coupler(s) (possibly multi-beam optical couplers of a plurality of beamforming elements) are formed as a photonic integrated circuit and the output of each multi-beam optical coupler is coupled to the input of a respective optical-to-electrical converter component using an optical fiber. In particular, for the downstream configuration, the multi-wavelength optical source, the imprinting-shifting components, and the multi-beam optical couplers are located at the controller 110 and the optical-to-electrical converter components are located at the RRH. The output of a respective multi-beam optical coupler and the input of a respective optical-to-electrical converter component are connected to one another using an optical fiber (e.g., a standard single mode fiber (SSMF)), in various embodiments. In the upstream configuration, multi-wavelength optical source, the imprinting-shifting components, and the multi-beam optical couplers are located at the RRH and the optical-to-electrical converter components are located at the controller 110. As in the downstream configuration, the output of each multi-beam optical coupler is coupled to a respective optical-to-electrical converter component via an optical fiber (e.g., an SSMF), in various embodiments. Given this separation of the components of the beamforming elements of the beamforming system, the controller 110 is responsible for the handling and processing of only the intermediate frequency radio signals, while the RRH handles A-RoF signals which are transferred to the RF domain. In various embodiments, selection of channels, frequency ranges, frequency bands, and/or the like used in embodiments employing A-RoF technology take into account chromatic dispersion and subsequent power fading effects in the radio-over-fiber transmission.

Example Embodiment of a Controller

Figure 13:
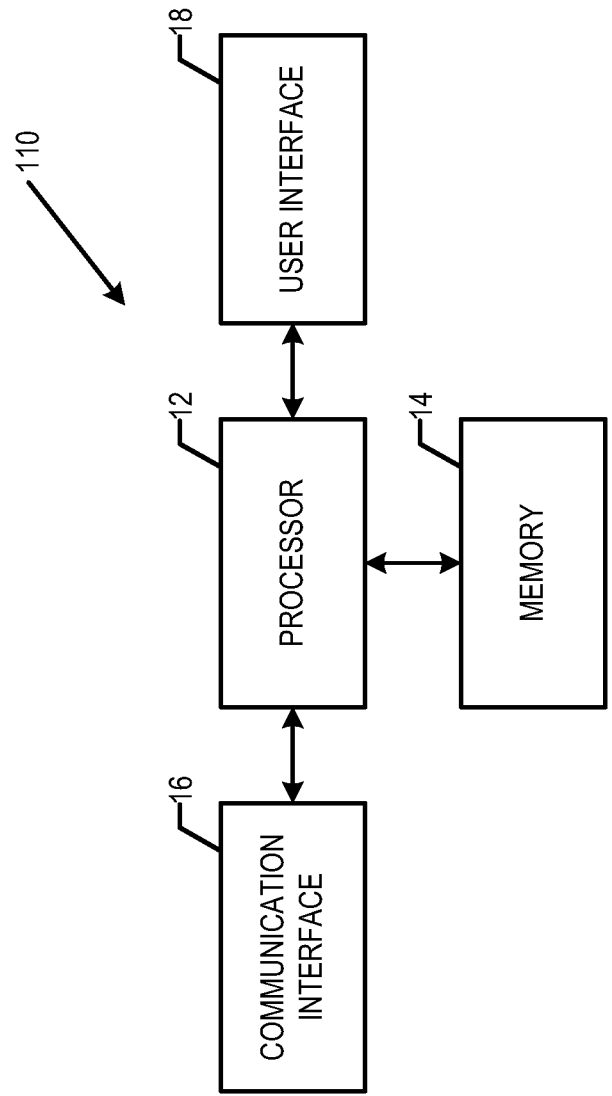
FIG. 13 is a block diagram of a controller, according to another example embodiment.

FIG. 13 provides an illustration of an example controller 110 that can be used in conjunction with various embodiments of the present invention. In an example embodiment, the controller 110 may be a BBU, server, group of servers, distributed computing system, and/or other computing system. In an example embodiment, a controller 110 comprises components similar to those shown in the example controller 110 diagrammed in FIG. 13. In an example embodiment, the controller 110 is configured to generate and/or cause generation of input signals to be provided to beamforming elements to cause a beamforming system to emit and/or transmit one or more transmissions, control respective optical phase shifts applied to respective imprinted beams by respective phase shifters of the beamforming elements of the beamforming system, receive electrical signals generated by beamforming elements of the beamforming system, and/or the like. For example, as shown in FIG. 1, the controller 110 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs), one or more graphics processing units (GPUs), and/or the like.

In some embodiments, the processor 12 (and/or co-processors or any other processing circuitry assisting or otherwise associated with the processor) may be in communication with the memory device 14 via a bus for passing information among components of the controller 110. The memory device 14 may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor 12). The memory device 14 may be configured to store information, data, content, applications, instructions, computer program code, or the like for enabling the apparatus to carry out various functions in accordance with an example embodiment of the present invention. For example, the memory device 14 could be configured to buffer input data for processing by the processor. Additionally or alternatively, the memory device 14 could be configured to store instructions, computer program code, and/or the like for execution by the processor 12.

As described above, the controller 110 may be embodied by a computing device. However, in some embodiments, the controller 110 may be embodied as a chip or chip set. In other words, the controller 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The controller 110 may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor 12 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12 may include one or more processing cores configured to perform independently. A multi-core processor may enable multiprocessing within a single physical package. Additionally or alternatively, the processor 12 may include one or more processors configured in tandem via the bus to enable independent execution of instructions, pipelining and/or multithreading.

In an example embodiment, the processor 12 may be configured to execute instructions and/or computer program code stored in the memory device 14 or otherwise accessible to the processor 12. Alternatively or additionally, the processor 12 may be configured to execute hard coded functionality. As such, whether configured by hardware or software methods, or by a combination thereof, the processor 12 may represent an entity (e.g., physically embodied in circuitry) capable of performing operations according to an embodiment of the present invention while configured accordingly. Thus, for example, when the processor 12 is embodied as an ASIC, FPGA or the like, the processor 12 may be specifically configured hardware for conducting the operations described herein. Alternatively, as another example, when the processor 12 is embodied as an executor of software instructions and/or computer program code, the instructions and/or computer program code may specifically configure the processor 12 to perform the algorithms and/or operations described herein when the instructions and/or computer program code are executed. However, in some cases, the processor 12 may be a processor of a specific device (e.g., a pass-through display or a mobile terminal) configured to employ an embodiment of the present invention by further configuration of the processor 12 by instructions and/or computer program code for performing the algorithms and/or operations described herein. The processor 12 may include, among other things, a clock, an arithmetic logic unit (ALU) and logic gates configured to support operation of the processor.

In some embodiments, the controller 110 may include a user interface 18 that may, in turn, be in communication with the processor 12 to provide output to the user, such as system alerts and/or the like, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, or other input/output mechanisms. Alternatively or additionally, the processor 12 may comprise user interface circuitry configured to control at least some functions of one or more user interface elements such as a display and, in some embodiments, a speaker, ringer, microphone and/or the like. The processor 12 and/or user interface circuitry comprising the processor may be configured to control one or more functions of one or more user interface elements through computer program instructions (e.g., software and/or firmware) stored on a memory accessible to the processor 12 (e.g., memory device 14 and/or the like).

The controller 110 may optionally include a communication interface 16. In an example embodiment, the controller may be in communication with one or more other apparatuses (e.g., recipient devices, transmitting devices, user devices, relays, and/or the like) via one or more wired and/or wireless networks (e.g., via the communications interface 16). For example, the controller 110 may be configured (e.g., via communications interface 16) to provide (e.g., transmit) and/or receive electronic communications via wireless or wired networks including, for example, a wired or wireless Personal Area Network (PAN), Local Area Network (LAN), Metropolitan Area Network (MAN), Wide Area Network (WAN), cellular network, and/or the like.

The communication interface 16 may be any means such as a device or circuitry embodied in either hardware or a combination of hardware and software that is configured to receive and/or transmit data from/to a network and/or any other device or module in communication with the controller 110. In this regard, the communication interface 16 may include, for example, an antenna (or multiple antennas) and supporting hardware and/or software for enabling communications with a wireless communication network. Additionally or alternatively, the communication interface 16 may include the circuitry for interacting with the antenna(s) to cause transmission of signals via the antenna(s) or to handle receipt of signals received via the antenna(s). In some environments, the communication interface 16 may alternatively or also support wired communication. As such, for example, the communication interface may include a communication modem and/or other hardware/software for supporting communication via cable, digital subscriber line (DSL), universal serial bus (USB), or other mechanisms.

Technical Advantages

Technical problems exist regarding how to introduce time delays into respective signals to be transmitted by various antennas of an antenna array or antenna elements of an antenna to perform beamforming. In particular, as the operating frequency of contemporary wireless systems is increasing and so does their (fractional) bandwidth, electronic implementations of imparting the time delay are facing challenges regarding phase-shift accuracy and excess loss across the signal bandwidth, physical dimensions, weight, power consumption, cost, and electromagnetic interference. Conventional techniques for imparting the time delay in the optical domain do so using a true time delay (e.g., a respective delay in the time domain). In particular, optical ring resonators are used to impart the time delay. Such techniques, however, present their own technical disadvantages including technically complex implementations, optical components (e.g., the ring resonators) which are required to be tuned to a high precision, and power consumption (e.g., to control the thermo-optic ring resonators).

Various embodiments provide technical solutions to these technical problems. For example, in various embodiments, the time delay required for beamforming is introduced into the transmissions by modifying and/or adjusting the optical phase of an optical signal imprinted with the information to be transmitted (and/or read/processed). For example, the time delay (e.g., optical phase shift) is introduced in the optical domain. Moreover, radio frequency (RF) up and down conversion is performed simultaneously as the introduction of the required time delay. Thus, various embodiments provide the advantage of reducing the energy consumption, cost, and space associated with RF up and down converter circuits. Moreover, various embodiments prevent the technical problems caused by the degradation of performance and fractional bandwidth of RF up and down converter circuits as operating frequencies continue to increase. Various embodiments provide the technical advantage of reducing the number of high speed electrical and/or electro-optical components required in addition to those present in the baseband unit (BBU).

Various embodiments further prevent the need for precisely-tuned sharp/steep optical filters for single-sideband (SSB) generations and/or precisely-tuned optical ring resonators for introducing true time delays. For example, as described with respect to beamforming element 900, by using optical filtering components configured to pass and/or receive optical beams respectively imprinted with non-adjacent and/or non-neighboring channels, frequency ranges, and/or frequency bands, various embodiments enable the density of channels to be increased (as long as the channels remain non-overlapping). For example, as described with respect to beamforming element 1000, the filtering may be performed in the electrical domain to take advantage of the fact that the cut-off function of electrical filters tends to be steeper than the cut-off function of optical filters. Thus, by filtering only in the electrical domain, in various embodiments, various embodiments enable the channels to be more densely defined (in the frequency domain) while still reducing or minimizing crosstalk between channels.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A beamforming element, the beamforming element comprising:
    an imprinting-shifting component configured to imprint a respective input signal onto a second beam to form an imprinted beam, wherein the imprinting-shifting component comprises
        at least one modulator, and
        a splitting optical filtering element configured to receive the imprinted beam and provide a plurality of output beams, each output beam of the plurality of output beams corresponding to a respective channel frequency range, and
        a plurality of phase shifters to adjust respective optical phases of the plurality of output beams independently to obtain respective phase-shifted imprinted beams;
    one or more multi-beam optical couplers each configured to receive a respective phase-shifted imprinted beam and a first beam, and further configured to cause the phase-shifted imprinted beam and the first beam to interfere with one another to form a respective interference beam; and
    one or more optical-to-electrical converter components each configured to receive a respective interference beam and generate a respective frequency-shifted electrical signal based on the respective interference beam and having a time delay corresponding to the adjustment of the optical phase of the imprinted beam.

2. The beamforming element of claim 1, wherein the respective frequency-shifted electrical signal is provided to a respective antenna of an antenna array to cause the respective antenna to transmit a transmission corresponding to the respective input signal.

3. The beamforming element of claim 2, wherein the beamforming element is configured to operate at M channels and the imprinting-shifting component comprises M respective modulators and M respective phase shifters, with each respective modulator of the M respective modulators optically coupled to a respective corresponding one of the M respective phase shifters.

4. The beamforming element of claim 3, wherein the respective input signal is one of M respective input signals that are each respectively provided to a respective modulator of the M respective modulators via a respective electrical input, each of the M respective input signals corresponding to a respective one of the M channels.

5. The beamforming element of claim 1, wherein the respective input signal is generated by a respective antenna of an antenna array based on a received transmission incident on the respective antenna.

6. The beamforming element of claim 5, wherein the imprinting-shifting component comprises one modulator and M phase shifters, wherein the antenna array is configured to operate at M channels.

7. The beamforming element of claim 6, wherein each of the M phase shifters is in optical communication with a respective multi-beam optical coupler of the one or more multi-beam optical couplers, and wherein each multi-beam optical coupler is in optical communication with a respective electronic converter element of the one or more optical-to-electrical converter components.

8. The beamforming element of claim 7, wherein the respective multi-beam coupler is in optical communication with only one respective phase shifter and the respective optical-to-electrical converter component is in optical communication with only one respective multi-beam coupler, and the respective electronic converter element comprises a respective band pass filter.

9. The beamforming element of claim 1, wherein the imprinting-shifting component further comprises a combining optical filtering element configured to receive a plurality of respective channel phase-shifted imprinted beams generated by respective phase shifters of the imprinting-shifting component, generate a phase-shifted imprinted beam therefrom, and provide the phase-shifted imprinted beam.

10. The beamforming element of claim 9, wherein the imprinting-shifting component comprises at least two optical filtering pairs, each optical filtering pair comprising a splitting optical filtering element and a combining filtering element, each optical filtering pair of the at least two optical filtering pairs configured to operate at one or more channels, the one or more channels being non-adjacent channels.

11. The beamforming element of claim 1, wherein an optical-to-electrical converter component of the one or more optical-to-electrical converter components comprises one or more photodetectors and the optical-to-electrical converter component is configured such that at least a portion of the interference beam provided by a respective multi-beam optical coupler of the one or more multi-beam optical couplers is incident on each of the one or more photodetectors.

12. The beamforming element of claim 11, wherein the respective multi-beam optical coupler is a 2×2 coupler and the one or more photodetectors comprises at least two photodetectors arranged in a differential configuration to reject a common mode signal.

13. The beamforming element of claim 1, wherein at least one of the one or more optical-to-electrical converter components comprises a filter configured to filter the respective electrical signal.

14. The beamforming element of claim 13, wherein the filter is one of a microwave band pass filter or a microwave low pass filter.

15. A beamforming system comprising:
an array of N antennas, where N is a positive integer;
at least one multi-wavelength optical source configured to provide at least one first beam of a first wavelength and at least one second beam of a second wavelength; and
N beamforming elements, each beamforming element of the N beamforming elements associated with a respective one of the N antennas, each beamforming element comprising:
an imprinting-shifting component configured to imprint a respective input signal onto the at least one second beam to form an imprinted beam, wherein the imprinting-shifting component comprises
at least one modulator, and
a splitting optical filtering element configured to receive the imprinted beam and provide a plurality of output beams, each output beam of the plurality of output beams corresponding to a respective channel frequency range, and
a plurality of phase shifters to adjust respective optical phases of the plurality of output beams independently to obtain respective phase-shifted imprinted beams;
one or more multi-beam optical couplers each configured to receive a respective phase-shifted imprinted beam and the at least one first beam, and further configured to cause the phase-shifted imprinted beam and the at least one first beam to interfere with one another to form a respective interference beam; and
one or more optical-to-electrical converter components each configured to receive a respective interference beam and generate a respective frequency-shifted electrical signal based on the respective interference beam and having a time delay corresponding to the adjustment of the optical phase of the imprinted beam.

16. The beamforming system of claim 15, further comprising a controller configured to at least one of (a) control the respective input signal, (b) control a control signal configured to control the adjustment of the optical phase of the imprinted beam, or (c) receive the respective electrical signal.

17. The beamforming system of claim 15, wherein the multi-wavelength optical source comprises a laser configured to generate a laser beam, an optical source modulator configured to modulate the laser beam, and an optical filtering component configured to filter the modulated laser beam to provide the at least one first beam and the at least one second beam.

18. The beamforming system of claim 15, wherein the multi-wavelength optical source comprises a frequency comb generator and an optical filtering component configured to filter an output of the frequency comb generator to provide the at least one first beam and the at least one second beam.

19. The beamforming system of claim 15, wherein a difference between a first frequency of the at least one first beam and a second frequency of the at least one second beam is a particular frequency difference, the respective electrical signal is characterized by a respective signal frequency and corresponds to a channel characterized by a radio frequency, a difference between the respective signal frequency and the radio frequency being the particular frequency difference.

20. The beamforming system of claim 15, wherein the imprinting-shifting component further comprises a combining optical filtering element configured to (1) receive a plurality of respective channel phase-shifted imprinted beams generated by respective phase shifters of the imprinting-shifting component, (2) generate a phase-shifted imprinted beam therefrom, and (3) provide the phase-shifted imprinted beam.

* * * * *

UNITED STATES PATENT AND TRADEMARK OFFICE
CERTIFICATE OF CORRECTION

PATENT NO. : 11,888,561 B2
APPLICATION NO. : 17/518966
DATED : January 30, 2024
INVENTOR(S) : Paraskevas Bakopoulos et al.

It is certified that error appears in the above-identified patent and that said Letters Patent is hereby corrected as shown below:

On the Title Page

Item (71) should read:
Applicants: Mellanox Technologies, Ltd., Yokneam (IL); Aristotle University of Thessaloniki, Thessaloniki (GR)

Item (73) should read:
Assignees: Mellanox Technologies, Ltd., Yokneam (IL); Aristotle University of Thessaloniki, Thessaloniki (GR)

Signed and Sealed this
Fifth Day of March, 2024

*Katherine Kelly Vidal*

Katherine Kelly Vidal
*Director of the United States Patent and Trademark Office*